United States Patent
Scanlon et al.

(10) Patent No.: US 8,900,333 B2
(45) Date of Patent: Dec. 2, 2014

(54) BIODIESEL COLD FLOW IMPROVER

(75) Inventors: Eugene Scanlon, Mamaroneck, NY (US); Kevin DeSantis, Valley Cottage, NY (US); Clemens Auschra, Freiburg (DE); Andreas Möck, Rheinfelden (DE)

(73) Assignee: BASF SE, Ludwigshafen (DE)

( * ) Notice: Subject to any disclaimer, the term of this patent is extended or adjusted under 35 U.S.C. 154(b) by 1044 days.

(21) Appl. No.: 12/316,721

(22) Filed: Dec. 16, 2008

(65) Prior Publication Data

US 2009/0151235 A1    Jun. 18, 2009

Related U.S. Application Data

(60) Provisional application No. 61/008,071, filed on Dec. 18, 2007.

(51) Int. Cl.
| | | |
|---|---|---|
| C10L 10/14 | (2006.01) | |
| C10L 1/236 | (2006.01) | |
| C10L 1/198 | (2006.01) | |
| C10L 1/196 | (2006.01) | |

(52) U.S. Cl.
CPC ............... *C10L 10/14* (2013.01); *C10L 1/2364* (2013.01); *Y02E 50/13* (2013.01); *C10L 2200/0476* (2013.01); *C10L 1/1985* (2013.01); *C10L 1/2366* (2013.01); *C10L 1/1963* (2013.01)
USPC .............................................. 44/459; 44/451

(58) Field of Classification Search
USPC .................................... 44/451, 459
See application file for complete search history.

(56) References Cited

U.S. PATENT DOCUMENTS

| | | | |
|---|---|---|---|
| 2,091,627 A | 6/1934 | Bruson | 87/9 |
| 2,100,993 A | 11/1937 | Bruson | 260/2 |
| 2,114,233 A | 4/1938 | Trainor et al. | 260/2 |
| 4,581,429 A | 4/1986 | Solomon et al. | 526/220 |
| 4,656,226 A | 4/1987 | Hutchins et al. | 525/93 |
| 4,867,894 A | 9/1989 | Pennewiss et al. | 252/56 |
| 5,578,090 A | 11/1996 | Bradin | 44/308 |
| 5,713,965 A | 2/1998 | Foglia et al. | 44/388 |
| 5,763,548 A | 6/1998 | Matyjaszewski et al. | 526/135 |
| 5,891,203 A | 4/1999 | Ball et al. | 44/388 |
| 6,015,440 A | 1/2000 | Noureddini | 44/388 |
| 6,174,501 B1 | 1/2001 | Noureddini | 422/189 |
| 6,203,585 B1 | 3/2001 | Majerczak | 44/388 |
| 6,265,360 B1 * | 7/2001 | DeTar et al. | 508/397 |
| 6,353,107 B1 * | 3/2002 | Kramer et al. | 546/216 |
| 6,391,996 B1 | 5/2002 | Scherer et al. | 526/323.1 |
| 6,398,707 B1 | 6/2002 | Wu et al. | 584/169 |
| 6,403,745 B1 | 6/2002 | Scherer et al. | |
| 6,407,187 B1 | 6/2002 | Matyjaszewski et al. | 526/89 |
| 6,433,100 B1 | 8/2002 | Kramer et al. | 525/327.6 |
| 6,531,547 B1 | 3/2003 | Visger et al. | |
| 2006/0185903 A1 | 8/2006 | Schmidt et al. | |
| 2010/0175310 A1 * | 7/2010 | Martyak et al. | 44/398 |

FOREIGN PATENT DOCUMENTS

| | | |
|---|---|---|
| WO | WO98/13392 | 4/1998 |
| WO | 9830601 | 7/1998 |
| WO | WO98/30601 | 7/1998 |
| WO | 0140339 | 6/2001 |
| WO | 2006074969 | 7/2006 |
| WO | 2008154558 | 12/2008 |

OTHER PUBLICATIONS

International Search Report dated May 18, 2009.

* cited by examiner

*Primary Examiner* — James Goloboy
(74) *Attorney, Agent, or Firm* — Melanie L. Brown

(57) ABSTRACT

The present invention is directed to the use of alkyl(meth) acrylate polymers or copolymers of the formula (I)

$$\text{In-Poly-(E)}_y \qquad \text{(I)}$$

as cold flow improvers in biodiesel fuel (or bio-fuel) and biodiesel compositions incorporating said polymers or copolymers, obtained by nitroxyl mediated controlled free radical polymerization,
wherein
In is the initiator fragment starting the polymerization reaction;
E is an end group bearing at least one stable free nitroxyl radical, which is bound via an oxygen atom to the polymer or copolymer; or a group which results from a substitution or elimination reaction of the attached stable free nitroxyl radical;
Poly is any polymer or copolymer formed from ethylenically unsaturated monomer(s);
and
y is a number 1 or greater than 1 indicating the average number of end groups E attached to Poly.

12 Claims, No Drawings

BIODIESEL COLD FLOW IMPROVER

This application takes the benefit of U.S. Provisional Application No. 61/008,071, filed Dec. 18, 2007, herein incorporated entirely by reference.

FIELD OF THE INVENTION

The present invention is directed to the use of alkyl(meth) acrylate polymers or copolymers obtained by nitroxyl mediated controlled free radical polymerization as cold flow improvers in biodiesel fuel (or bio-fuel) and biodiesel compositions incorporating said polymers or copolymers.

BACKGROUND

Biodiesel is an alternative renewable fuel made from vegetable oils, fats, greases or other sources of triglycerides. It is a nontoxic and biodegradable substitute and supplement for petroleum diesel.

Biodiesel fuels typically comprise lower alkyl fatty acid esters, prepared for example by transesterifying triglycerides with lower alcohols, e.g. methanol or ethanol. A typical biodiesel fuel is the fatty acid methyl ester of rapeseed oil or of soy oil.

Biodiesel fuel and its preparation is taught for example in U.S. Pat. Nos. 5,578,090, 5,713,965, 5,891,203, 6,015,440, 6,174,501 and 6,398,707, the contents of which are hereby incorporated by reference.

One of the major problems associated with the use of biodiesel is its poor cold flow properties resulting from crystallization of saturated fatty compounds in cold conditions. A 20° C. reduction in cold filter plugging point is necessary for some biodiesel fuels to find utility in colder climates such as those of the United States and Europe in winter.

It is well known to add pour point depressants or cold flow additives to conventional petroleum-based fuel oil in order to improve it cold flow properties.

Long chain poly alkyl(meth)acrylates are a class of pour point depressant additives for petroleum-based fuel. These compounds are described, for example in U.S. Pat. Nos. 2,091,627, 2,100,993, 2,114,233 and 4,867,894.

Attempts have been made to apply the same long chain poly alkyl(meth)acrylates to improve the cold flow properties of biodiesel fuels.

For example, U.S. Pat. Nos. 6,203,585 and 6,391,996, herein incorporated entirely by reference, disclose a biodiesel fuel composition having a depressed pour point comprising a copolymer additive formed from long chain alkyl(meth)acrylate monomers.

Many different well-established methods are available for polymerizing these long chain poly alkyl(meth)acrylates. Most methods have the disadvantage that uncontrollable recombination reactions of initiator radicals may occur immediately after their formation with the effect that variable ratios between initiator radicals and stable free radicals are produced. Consequently, in some cases there is an inefficient control of the polymerization process.

Group Transfer Polymerization (GTP) is a well-established method for producing A-B block copolymers of defined structure from methacrylate monomers. Despite its wide applicability and usefulness the GTP method still has several drawbacks. The polymerization initiators used in this method, such as the silyl ketene acetals disclosed in U.S. Pat. No. 4,656,226, e.g. 1-trimethylsilyloxy-1-isobutoxy-2-methylpropene, are highly reactive and difficult to prepare in a multi-step synthesis. This necessitates the use of carefully dried and purified reactants, which limits this method in industrial applications operating on a large scale.

U.S. Pat. Nos. 5,763,548 and 6,407,187 disclose a controlled or "living" polymerization process of ethylenically unsaturated polymers, such as styrene or (meth)acrylates, by employing the Atomic Transfer Radical Polymerization (ATRP) method. This method produces defined oligomeric homopolymers and copolymers, including block copolymers. Initiators are employed, which generate radical atoms, such as .Cl, in the presence of a redox system of transition metals of different oxidation states, e.g. Cu(I) and Cu(II), providing "living" or controlled radical polymerization. U.S. Pat. No. 6,391,996 uses just such a system for the production of poly alkyl(meth)acrylates for biodiesel applications.

A general drawback of this prior art method is seen in the fact that the polymer chains prepared by ATRP contain halogen as terminal fragment, which has been transferred from the polymerization initiator. The content of halogen is generally undesirable in polymers. Halogen, especially chlorine and bromine, is subject to the removal as hydrogen halide depending on temperature, especially above 150° C. The double bond thus formed is subject to a reaction with atmospheric oxygen, which decreases the antioxidative resistance of the polymer. Moreover, hydrogen halide liberated from the polymer reacts with other functional groups present in the polymer, such as ester groups present in acrylates. Depending on the type of the polymer, chlorine is also removed in the form of a radical, which might initiate undesirable chain reactions in the polymer structure. The removal of halogen from the polymer structure, especially from the terminal position of the polymer chain, and its replacement with suitable substituents in a subsequent process step is described in U.S. Pat. No. 6,433,100. Another drawback to ATRP is the removal of the copper catalyst from the final product. Copper is a pro-oxidant and should be avoided for applications involving fuels and lubricants because it can catalyze rapid oxidation. In applications such as biodiesel, the presence of copper is especially concerning because biodiesel is generally less stable towards oxidation than conventional petroleum diesel.

U.S. Pat. No. 4,581,429 discloses a free radical polymerization process by the controlled or "living" growth of polymer chains. A specific process embodiment is the use of initiators of the partial formula R'R"N—O—X. In the polymerization process the free radical species R'R"N—O. and .X are generated. .X is a free radical group, e.g. a tert-butyl or cyanoisopropyl radical, capable of polymerizing monomer units containing ethylene groups. The monomer units A are substituted by the initiator fragments R'R"N—O. and .X and polymerize to structures of the type: R'R"N—O-A-X (A: polymer block). Specific R'R"N—O—X initiators mentioned are derived from cyclic structures, such as 2,2,6,6-tetramethylpiperidine, or open chain molecules, such as di-tert-butylamine. Recently some alternative polymerization regulators have been published. WO 98/30601 discloses heterocyclic >N—O—R compounds suitable for controlled polymerization processes. WO 98/13392 discloses open chain alkoxyamines, which are derived from NO-gas or from nitroso compounds. The advantage of these prior art polymerization methods over the ATRP-method is seen in the fact that no subsequent replacement of terminal groups of the polymer chains is needed.

The present inventors have found that the preparation of polymers or copolymers of alkyl(meth)acrylates via nitroxyl mediated controlled free radical polymerization (CFRP) provides (co)polymers of well controlled molecular weight and polydispersity without the problematic terminal groups or copper contamination produced by ATRP methods. Furthermore, the CFRP polymeric (meth)acrylates are effective as cold flow improvers for biofuels.

SUMMARY OF THE INVENTION

The invention encompasses a biodiesel fuel composition comprising
a) biodiesel fuel
and
b) a polymer or copolymer of the formula (I)

$$\text{In-Poly-(E)}_y \qquad \text{(I)}$$

obtained by nitroxyl mediated controlled free radical polymerization wherein
In is the initiator fragment starting the polymerization reaction;
E is a group bearing at least one stable free nitroxyl radical, which is bound via an oxygen atom to the polymer or copolymer; or a group which results from a substitution or elimination reaction of the attached stable free nitroxyl radical;
Poly is any polymer or copolymer formed from ethylenically unsaturated monomer(s);
y is a number 1 or greater than 1 indicating the average number of end groups E attached to Poly.

The end group E is preferably

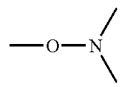

The biodiesel fuel will normally make up about 2.0 to about 99.8 wt. % of the biodiesel fuel composition. The polymer or copolymer will normally make up about 0.05 to about 20 wt. %, preferably about 0.1 to about 15 wt. %, most preferable about 0.5 wt. % to about 10 wt. %. of the composition. The weight % is based on the total biodiesel fuel composition. The total biodiesel fuel composition may optionally contain other additives.

The invention also includes a method for improving the cold flow properties of a biodiesel fuel composition, which steps comprise adding to a biodiesel fuel at least 0.05 wt. % of the polymer of formula (I) described above, where the wt. % is based on the total biodiesel fuel composition.

DETAILED DESCRIPTION OF THE INVENTION

Definition of General Terms

The term (meth)acrylate or (meth)acrylic is shorthand respectively for methacrylate, acrylate and acrylic, methacrylic acid.

Monomer refers to an ethylenically unsaturated compound before polymerization. Once the monomer is polymerized, the monomer becomes a monomer unit or monomer repeat unit making up the polymers.

Molecular weight refers to molecular number (Mn) unless otherwise stated.

Biodiesel

Biodiesel fuel generally refers to renewable fuel made from vegetable or animal oils, fats, greases or other sources of triglycerides. Most commonly, biodiesel fuels comprise lower alkyl fatty acid esters, prepared for example by transesterifying triglycerides with lower alcohols, e.g. methanol or ethanol. A typical biodiesel fuel is the fatty acid methyl ester of rapeseed oil or of soy oil. A non-exhaustive list of vegetable or animal oils may include rapeseed oil, soy, palm oil, palm olein, palm stearin, palm kernel oil, coriander oil, cottonseed oil, sunflower oil, castor oil, olive oil, peanut oil, maize oil, almond oil, palmseed oil, coconut oil, mustardseed oil, bovine tallow, bone oil, fish oils, used cooking oils and mixtures thereof.

Mixtures of various sources of vegetable or animal oils in the formulation of biodiesel are fairly common, for example Publication No. 20060288637, represents a particular mixture of biodiesel formed from palm oil. The publication is herein incorporated entirely by reference. The polymers of formula (I) may be formulated in these palm based biodiesel blends.

Biodiesel fuels may also be esterified with alternative alcohols such as butyl, isopropyl, 2-butyl and tert-butyl. For example U.S. Pat. No. 5,520,7089 describes such esters of liquid fatty acids combined with petroleum distillate fuel. The combination is alleged to reduce the crystallization temperature of the combination. Thus the present invention also covers blends of biodiesel fuel with petroleum distillates and the polymer described above by formula (I).

Poly

Poly in formula (I) above refers to any polymer or copolymer formed by nitroxyl mediated controlled free radical polymerization. Poly may be of any architecture such as block, random, comb, star or gradient. The term block copolymer comprises random block, multi block, star or gradient copolymers.

All possible polymer chain structures are comprised: e.g. linear or branched. If the monomers are selected from chemically different monomers, all possible monomer sequence structures are comprised, e.g. random-, blocklike, multiblock-, tapered- or gradient arrangement of the different monomers.

Under gradient polymers or gradient arrangement there are understood block copolymers, which are prepared in such a way, that the intersection between the two blocks is not a sharp boundary, but represents a continuous transition from one type of monomer to another type of monomer, i.e. both monomers extending to both blocks. This type of polymers can be obtained when the polymerization process is carried out for example in one step using monomers of different copolymerization parameters or by a multistep procedure, in which the monomer composition is stepwise changed by addition of appropriate amounts of another type of monomer. Another preferred procedure for the synthesis of gradient polymers is by using continuous feed processes, in which for example the controlled polymerization is started with a first monomer and before complete conversion, a second monomer is continuously fed to the reaction mixture, thus realizing a continuous transition along the polymer chains.

Because the nitroxyl mediated controlled free radical polymerization is a "quasi living" polymerization, it can be started and stopped practically at will. Furthermore, the polymer product retains the functional alkoxyamine group allowing a continuation of the polymerization in a living matter. Thus, once the first monomer is consumed in the initial radical polymerizing step a second monomer can then be added to form a second block on the growing polymer chain in a second polymerization step. Therefore it is possible to carry out additional polymerizations with the same or different monomer(s) to prepare multi-block copolymers.

Furthermore, since this is a "quasi living" radical polymerization, blocks can be prepared in essentially any order. One is not necessarily restricted to preparing block copolymers where the sequential polymerizing steps must flow from the least stabilized polymer intermediate to the most stabilized polymer intermediate, such as is the case in ionic polymerization. Thus it is possible to prepare a multi-block copolymer in which a polyacrylonitrile or a poly(meth)acrylate block is prepared first, then a styrene or butadiene block is attached thereto, and so on.

Random copolymers, tapered or gradient copolymer structures can be synthesized as well by using a mixture of monomers or adding a second monomer before the first one is completely consumed.

Thus the Poly may for example be a copolymer of blocks A and B which comprise at least two different repeating units of polymerizable ethylenically unsaturated monomers.

These ethylenically unsaturated monomers are characterized by the presence of at least one group >C=C<. Representative monomers are styrenes, substituted styrenes, (meth)acrylic acid, (meth)acrylic acid ($C_1$-$C_{36}$)alkyl esters, (meth)acrylic acid ($C_1$-$C_{30}$)hydroxyalkyl or ($C_1$-$C_{30}$) polyhydroxy alkyl esters, (meth)acrylic esters of alkoxylated alcohols like ethoxylated fatty alcohols, (meth)acrylic poly-$C_2$-$C_4$alkyleneglycol esters, (meth)acrylic esters of alkoxylated phenols like ethoxylated nonylphenol, (meth)acrylic acid ($C_1$-$C_{36}$)alkyl esters which esters are substituted by amino, (meth)acrylamide N-mono($C_1$-$C_{30}$)alkyl, N,N-di($C_1$-$C_{30}$) alkyl(meth)acrylamide, which mono or disubstituted (meth)acrylamide ($C_1$-$C_{30}$)alkyl groups may additionally be unsubstituted or substituted by amino or mixtures thereof.

Suitable styrenes may be substituted at the phenyl group by one to three additional substituents selected from the group consisting of hydroxy, $C_1$-$C_4$alkoxy, e.g. methoxy or ethoxy, halogen, e.g. chloro, and $C_1$-$C_4$alkyl, e.g. methyl or methyl.

Suitable (meth)acrylic acid ($C_1$-$C_{36}$) alkyl esters may for example be methyl, ethyl, n-butyl, isobutyl, tert-butyl, n-pentyl, neopentyl, hexyl, 2-ethylhexyl, octyl, isobornyl, isodecyl, n-dodecyl, n-tetradecyl, n-hexadecyl n-octadecyl(meth)acylates. Also envisioned are long chain alkyl esters of (meth)acylate such as stearyl(meth)acrylate, octadecyl(meth)acrylate, heptadecyl(meth)acrylate, nonadecyl(meth)acrylate, eicosyl(meth)acrylate, henicosyl(meth)acrylate, docosyl(meth)acrylate, tricosyl(meth)acrylate, tetracosyl(meth)acrylate, pentacosyl(meth)acrylate, hexacosyl(meth)acrylate, octacosyl(meth)acrylate, nonacosyl(meth)acrylate, triacontyl(meth)acrylate, behenyl(meth)acrylate and mixtures thereof.

The (meth)acrylate esters may be branched or unbranched.

(Meth)acrylic acid ($C_1$-$C_{30}$)hydroxyalkyl esters are for example $C_1$-$C_4$ alkylhydroxyl(meth)acrylates such as (meth)acrylic acid-2-hydroxyethylesters (HEA, HEMA) or (meth)acrylic acid-2-hydroxypropylester (HPA, HPMA).

Suitable (meth)acrylic acid ($C_1$-$C_{30}$)alkyl polyhydroxy esters are for example $C_1$-$C_4$alkyl(meth)acrylic acid-polyhydroxy-$C_3$-$C_6$alkyl esters such as (meth)acrylic acid esterified by ethylene glycol or glycerol.

Representative $C_1$-$C_4$alkyl(meth)acrylic acid esters having poly-$C_2$-$C_4$alkyleneglycol ester groups, wherein the ester groups may be substituted with $C_1$-$C_{24}$alkoxy groups, are illustrated by the formula given below:

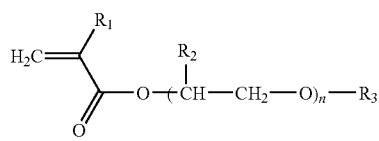

wherein
n represents a numeral from one to 100; preferably 2 to about 20.
$R_1$ and $R_2$ independently of one another represent hydrogen or methyl; and
$R_3$ represents $C_1$-$C_{24}$alkyl, e.g. methyl, ethyl, n- or isopropyl, n-, iso-, or tert-butyl, n- or neopentyl, n-dodecyl, n-tetradecyl, n-hexadecyl or n-octadecyl.

Representative (meth)acrylic acid ($C_1$-$C_{30}$)alkyl esters which esters are substituted by amino are for example $C_1$-$C_4$ dialkylaminoalkyl(meth)acrylates such as dimethylaminoethyl(meth)acrylate, dimethylaminopropyl(meth)acrylate, diethylaminoethyl(meth)acrylate and diethylaminopropyl (meth)acrylate Representative examples of (meth)acrylamide N-mono ($C_1$-$C_{30}$)alkyl, or N,N-di($C_1$-$C_{30}$)alkyl acrylamide, which mono or disubstituted ($C_1$-$C_{30}$)alkyl groups may additionally be substituted by amino are for example N-mono($C_1$-$C_4$) alkyl or N,N-di($C_1$-$C_4$) alkyl(meth)acrylamide such as
2-dimethylaminoethyl(meth)acrylamide, 3-dimethylaminopropyl(meth)acrylamide,
2-diethylaminoethyl(meth)acrylamide, 2-t-butylaminoethyl (meth)acrylate and 3-diethylaminopropyl(meth)acrylamide.

Representative ($C_1$-$C_{30}$)alkyl mono and di N substituted (meth)acrylamides may be for example ($C_1$-$C_4$)alkyl, (meth)acrylamide, such as N-ethyl, (meth)acrylamide, N,N-dimethyl, (meth)acrylamide and N,N-diethyl, (meth)acrylamide.

As mentioned above, Poly may be for example a mono, di, tri or tetra or greater block copolymer. Each block may be formed from one monomer or several but each block will differ in at least one characteristic. For example, each block may contain different comonomers, different comonomer contents, molecular weights and/or degrees of branching.

Representative examples include mono block nitroxyl mediated controlled free radical polymerization polymers of formula ($I_1$)

$$\text{In-}(A)_n\text{-}(E)_y \qquad (I_1).$$

E and In are defined as above and y is a number 1 or greater than 1 indicating the average number of end groups E attached to $(A)_n$ and n is a number from 1 to 5000.
A is a polymer block.
Examples such as
n-ethylyhexyl(meth)acrylate, 2-hydroxyethyl(meth)acrylate, b-2-dimethylaminoethyl(meth)acrylate, t-butyl(meth)acrylate, lauryl(meth)acrylate, stearyl(meth)acrylate, 2-hydroxypropyl(meth)acrylate and N,N-dimethylaminopropyl (meth)acrylamide are envisioned.

Representative examples include diblock nitroxyl mediated controlled free radical polymerization polymers of formula ($I_2$)

$$\text{In-}(A)_n(B)_m\text{-}(E)_y \qquad (I_2).$$

A and B are polymer blocks.
E, In, n, y are defined as above and m is a number 1 to 5000.
Diblock nitroxyl mediated controlled free radical polymerization polymers such as n-ethylhexyl(meth)acrylate-b-2-hydroxyethyl(meth)acrylate, n-ethylhexyl(meth)acrylate-b-2-dimethylaminoethyl(meth)acrylate, n-ethylhexyl(meth) acrylate-b-2-hydroxypropyl(meth)acrylate, n-ethylhexyl (meth)acrylate-b-t-butyl(meth)acrylate, n-ethylhexyl(meth) acrylate-b-acrylic acid, n-ethylhexyl(meth)acrylate-b-N,N-dimethyl(meth)acrylamide, n-butyl(meth)acrylate-b-2-hydroxyethyl(meth)acrylate, n-ethylhexyl(meth)acrylate-b-lauryl(meth)acrylate and lauryl(meth)acrylate-b-2-hydroxyethyl(meth)acrylate.

Corresponding random copolymers should also be mentioned as another possible class of copolymers. In this case the "-co-" would apply rather than "-b-" as above. Still another class of copolymers would be "gradient" copolymers. In this case "-grad-" would apply instead of "-b-" as above.

The diblock may contain a single homopolymer block and a random copolymer such as n-ethylhexyl(meth)acrylate-b-random copolymer block of 2-hydroxyethyl(meth)acrylate and n-ethylhexyl(meth)acrylate.

It is also possible for the block copolymer to be modified after the blocks are formed. For example, a t-butyl(meth) acrylate block might easily be hydrolyzed to produce an (meth)acrylic acid block. A n-butyl(meth)acrylate block might be transesterified with a long chain alcohol such as stearyl, lauryl alcohol or n-ethylhexyl alcohol. The transesterifying long chained alcohols may be branched or unbranched.

Transesterification reactions may be carried out by known methods. For example a polymer block containing lower $C_1$-$C_4$ alkyl(meth)acrylate may be treated with a transesterification catalyst such well-known catalysts selected e.g. from tetra-isopropyltitanate, tetra-butyltitanate, alkali- or earth alkali alcoholates like NaOMe or LiOMe in the presence of a long chain alcohol such as $C_8$-$C_{36}$ alcohols.

Representative examples of long chain alcohols and reaction conditions for such transesterification reactions on preformed polymers made via nitroxyl mediated polymerization can be found in WO2006/074969.

Thus the biodiesel composition in which the polymer of formula I is obtained by nitroxyl mediated free radical polymerization may be subsequently modified by a transesterification reaction.

Representative examples include triblock nitroxyl mediated controlled free radical polymerization polymers of formula ($I_3$)

$$\text{In-(C)}_p\text{-(A)}_n\text{-(B)}_m\text{-(E)}_y \qquad (I_3).$$

A, B and C are polymer blocks.
E, In, n, m, y are defined as above and p is a number 1 to 5000.

Representative triblock examples may be n-butyl(meth) acrylate-b-stearyl(meth)acrylate-b-N,N dimethylpropylamino(meth)acrylamide and n-butyl(meth)acrylate-b-lauryl(meth)acrylate-b-N,N dimethylpropylamino(meth) acrylamide.

Representative examples include tetrablock nitroxyl mediated controlled free radical polymerization polymer of formula ($I_4$)

$$\text{In-(D)}_o\text{-(C)}_p\text{-(A)}_n\text{-(B)}_m\text{-(E)}_y \qquad (I_4).$$

A, B, C and D are polymer blocks.
E, In, n, m, y and p are defined as above and o is a number from 1 to 5000.

Tetrablock examples are n-butyl(meth)acrylate-b-n-hexylethyl(meth)acrylate-b-stearyl(meth)acrylate-b-N,N dimethylpropylamino(meth)acrylamide, n-butyl(meth)acrylate-b-n-lauryl(meth)acrylate-b-stearyl(meth)acrylate-b-N,N dimethylpropylamino(meth)acrylamide and n-butyl(meth) acrylate-b-stearyl(meth)acrylate-b-polyethylene glycol (meth)acrylate.

Controlled Free Radical Polymerization

It is mandatory that the polymer or copolymer of formula (I), component ii), is prepared by nitroxyl mediated controlled free radical polymerization (CFRP). Solomon et al. in U.S. Pat. No. 4,581,429 have firstly described such processes.

U.S. Pat. No. 4,581,429 discloses a free radical polymerization process by controlled or "living" growth of polymer chains, which produces defined oligomeric homopolymers and copolymers, including block and graft copolymers. Disclosed is the use of initiators of the partial formula R'R"N— O—X. In the polymerization process the free radical species R'R"N—O. and .X are generated. .X is a free radical group, e.g. a tert.-butyl or cyanoisopropyl radical, capable of polymerizing monomer units containing ethylene groups.

A variation of the above process is disclosed in U.S. Pat. No. 5,322,912 wherein the combined use of a free radical initiator and a stable free radical agent of the basic structure R'R" N—O. for the synthesis of homopolymers and block copolymers is described.

These processes are useful for the preparation of homo-, random-, block-, tapered-, graft- or comb (co)polymers, which have a narrow molecular weight distribution and hence a low polydispersity index. Thus the polydispersity index ranges from about 1.1 to about 2.5, for example about 1.1 to about 2.0 or about 1.1 to about 1.6.

As already mentioned it is indispensable that the polymers or copolymers are obtained by nitroxyl mediated controlled free radical polymerization (CFRP).

There are essentially two suitable routes:

b1) polymerization in the presence of alkoxyamine initiator/regulator compounds having the structural element

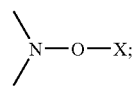

and b2) polymerization in the presence of a stable nitroxyl free radical having the structural element

and a radical initiator (source of free radicals).

For example the structural element

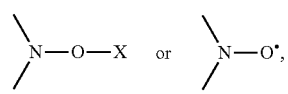

may be part of a cyclic ring system or substituted to form a acyclic structure.

Suitable nitroxylethers and nitroxyl radicals are principally known from U.S. Pat. No. 4,581,429 or EP-A-621 878, herein incorporated entirely by reference. Particularly useful are the open chain compounds described in WO 98/13392, WO 99/03894 and WO 00/07981, the piperidine derivatives described in WO 99/67298 and GB 2335190 or the heterocyclic compounds described in GB 2342649 and WO 96/24620.

Further suitable nitroxylethers and nitroxyl radicals are described in WO 02/4805 and in WO 02/100831.

Nitroxylethers and nitroxyl radicals with more than one nitroxyl group in the molecule are for example described in U.S. Pat. No. 6,573,347, WO 01/02345 and WO 03/004471. These compounds are ideally suitable when branched, star or comb (co)polymers are prepared. In this case y in formula (I) above is greater than 1.

In the context of the present invention the terms alkoxyamine and nitroxylether are used as equivalents.

Stable free radicals having a structural element

are for example disclosed in EP-A-621 878

Examples, such as

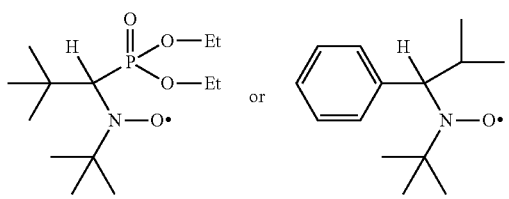

are given in WO 96/24620.

Preferably the structural elements

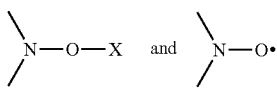

are part of a 5 or 6-membered heterocyclic ring, which optionally has an additional nitrogen or oxygen atom in the ring system. Substituted piperidine, morpholine and piperazine derivatives are particularly useful.

Preferably the structural element

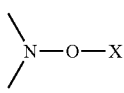

is a structural element of formula (II) and the structural element

is a structural element of formula (II')

(II)

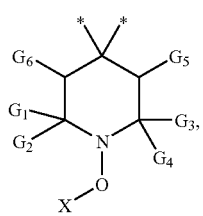

(II')

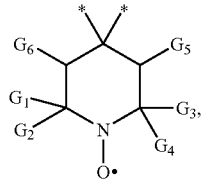

wherein $G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;

$G_5$, $G_6$ independently are H, $C_1$-$C_{18}$alkyl, phenyl, naphthyl or a group COO$C_1$-$C_{18}$alkyl;

X is selected from the group consisting of

—CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

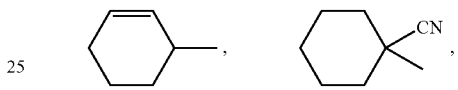

—CH$_2$CH=CH$_2$, CH$_3$CH—CH=CH$_2$ (C$_1$-C$_4$alkyl)CR$_{20}$—C(O)-phenyl, (C$_1$-C$_4$)alkyl-CR$_{20}$—C(O)—(C$_1$-C$_4$) alkoxy, (C$_1$-C$_4$)alkyl-CR$_{20}$—C(O)—(C$_1$-C$_4$)alkyl, (C$_1$-C$_4$) alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein $R_{20}$ is hydrogen or (C$_1$-C$_4$)alkyl and

* denotes a valence.

In particular the structural element of formula (II) is of formula A, B or O, (A)

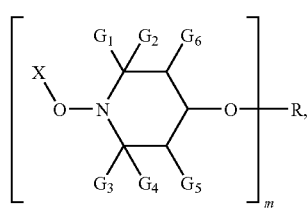

(B)

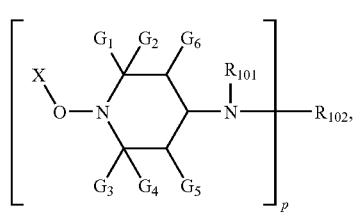

(O)

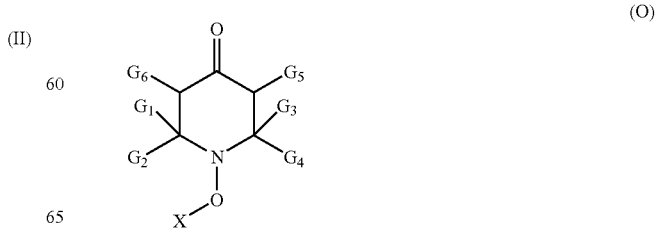

wherein
m is 1,
R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;
p is 1;
$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;
$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH$_2$CH(OH)—Z or of the formula —CO—Z or —CONH—Z wherein Z is hydrogen, methyl or phenyl;
$G_6$ is hydrogen and $G_5$ is hydrogen or $C_1$-$C_4$alkyl,
$G_1$ and $G_3$ are methyl and $G_2$ and $G_4$ are ethyl or propyl or $G_1$ and $G_2$ are methyl and $G_3$ and $G_4$ are ethyl or propyl; and
X is selected from the group consisting of
—CH$_2$-phenyl, CH$_3$CH-phenyl, (CH$_3$)$_2$C-phenyl, ($C_5$-$C_6$cycloalkyl)$_2$CCN, (CH$_3$)$_2$CCN,

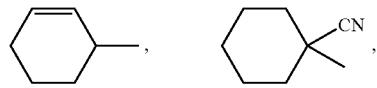

—CH$_2$CH═CH$_2$, CH$_3$CH—CH═CH$_2$ ($C_1$-$C_4$alkyl)CR$_{20}$—C(O)-phenyl, ($C_1$-$C_4$)alkyl-CR$_{20}$—C(O)—($C_1$-$C_4$)alkoxy, ($C_1$-$C_4$)alkyl-CR$_{20}$—C(O)—($C_1$-$C_4$)alkyl, ($C_1$-$C_4$)alkyl-CR$_{20}$—C(O)—N-di($C_1$-$C_4$)alkyl, ($C_1$-$C_4$)alkyl-CR$_{20}$—C(O)—NH($C_1$-$C_4$)alkyl, ($C_1$-$C_4$)alkyl-CR$_{20}$—C(O)—NH$_2$, wherein
$R_{20}$ is hydrogen or ($C_1$-$C_4$)alkyl.

The above compounds and their preparation are described in GB 2 335 190 and GB 2 361 235.

Another preferred group of nitroxylethers are those of formula (IIc), (IId), (IIe), (IIf), (IIg) or (IIh)

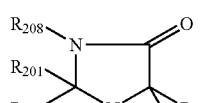
(IIc)

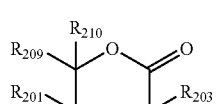
(IId)

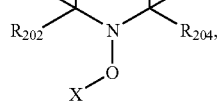
(IIe)

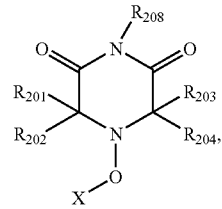
(IIf)

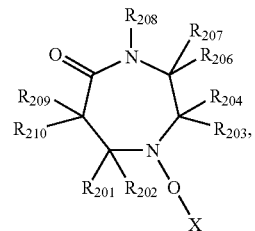
(IIg)

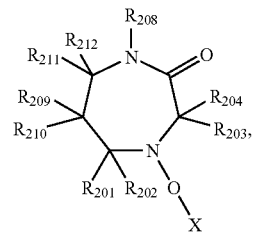
(IIh)

wherein $R_{201}$, $R_{202}$, $R_{203}$ and $R_{204}$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_{205}$, $C_2$-$C_{18}$alkyl which is interrupted by at least one O atom and/or NR$_{205}$ group, $C_3$-$C_{12}$cycloalkyl or $C_6$-$C_{10}$aryl or $R_{20}$, and $R_{202}$ and/or $R_{203}$ and $R_{204}$ together with the linking carbon atom form a $C_3$-$C_{12}$cycloalkyl radical;
$R_{205}$, $R_{206}$ and $R_{207}$ independently are hydrogen, $C_1$-$C_{18}$alkyl or $C_6$-$C_{10}$aryl;
$R_{208}$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_{205}$, $C_2$-$C_{18}$alkyl which is interrupted by at least one O atom and/or NR$_{205}$ group, $C_3$-$C_{12}$cycloalkyl or $C_6$-$C_{10}$aryl, $C_7$-$C_9$-phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl;
$R_{209}$, $R_{210}$, $R_{211}$ and $R_{212}$ are independently hydrogen, phenyl or $C_1$-$C_{18}$alkyl; and
X is selected from the group consisting of —CH$_2$-phenyl, CH$_3$CH-phenyl, (CH$_3$)$_2$C-phenyl, ($C_5$-$C_6$cycloalkyl)$_2$CCN, (CH$_3$)$_2$CCN,

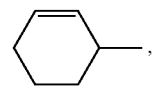

—CH$_2$CH═CH$_2$, CH$_3$CH—CH═CH$_2$ ($C_1$-$C_4$alkyl)CR$_{20}$—C(O)-phenyl, ($C_1$-$C_4$)alkyl-CR$_{20}$—C(O)—($C_1$-$C_4$)alkoxy, ($C_1$-$C_4$)alkyl-CR$_{20}$—C(O)—($C_1$-$C_4$)alkyl, ($C_1$-$C_4$)alkyl-CR$_{20}$—C(O)—N-di($C_1$-$C_4$)alkyl, ($C_1$-$C_4$)alkyl-CR$_{20}$—C(O)—NH($C_1$-$C_4$)alkyl, ($C_1$-$C_4$)alkyl-CR$_{20}$—C(O)—NH$_2$, wherein
$R_{20}$ is hydrogen or ($C_1$-$C_4$)alkyl.

More preferably in formula (Ic), (Id), (Ie), (f), (Ig) and (Ih) at least two of $R_{201}$, $R_{202}$, $R_{203}$ and $R_{204}$ are ethyl, propyl or butyl and the remaining are methyl; or $R_{201}$ and $R_{202}$ or $R_{203}$ and $R_{204}$ together with the linking carbon atom form a $C_5$-$C_6$cycloalkyl radical and one of the remaining substituents is ethyl, propyl or butyl.

Most preferably X is $CH_3CH$-phenyl.

The above compounds and their preparation is described in GB 2342649.

Further suitable compounds are the 4-imino compounds of formula (III)

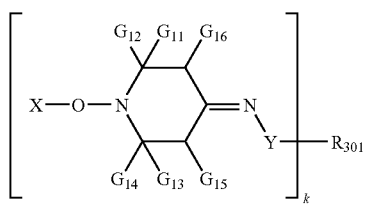

(III)

wherein
$G_{11}$, $G_{12}$, $G_{13}$ and $G_{14}$ are independently $C_1$-$C_4$alkyl or $G_{11}$ and $G_{12}$ together and $G_{13}$ and $G_{14}$ together, or $G_{11}$ and $G_{12}$ together or $G_{13}$ and $G_{14}$ together are pentamethylene;
$G_{15}$ and $G_{16}$ are each independently of the other hydrogen or $C_1$-$C_4$alkyl;
X is as defined above;
k is 1, 2, 3, or 4
Y is O, $NR_{302}$ or when n is 1 and $R_{301}$ represents alkyl or aryl Y is additionally a direct bond;
$R_{302}$ is H, $C_1$-$C_{18}$alkyl or phenyl;
if k is 1
$R_{301}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl;
$C_5$-$C_{12}$cycloalkyl or $C_5$-$C_{12}$cycloalkenyl; phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;
—C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;
—$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammonium or an alkali metal cation;
if k is 2
$R_{301}$ is $C_1$-$C_{18}$alkylene, $C_3$-$C_{18}$alkenylene or $C_3$-$C_{18}$alkinylene, which may be unsubstituted or substituted, by one or more OH, $C_1$-$C_8$alkoxy, carboxy, $C_1$-$C_8$alkoxycarbonyl;
or xylylene; or
$R_{301}$ is a bisacyl radical of an aliphatic dicarboxylic acid having 2 to 36 carbon atoms, or a cycloaliphatic or aromatic dicarboxylic acid having 8-14 carbon atoms;
if k is 3,
$R_{301}$ is a trivalent radical of an aliphatic, cycloaliphatic or aromatic tricarboxylic acid; and
if k is 4, $R_{301}$ is a tetravalent radical of an aliphatic, cycloaliphatic or aromatic tetracarboxylic acid.

Preferably $G_{16}$ is hydrogen and $G_{15}$ is hydrogen or $C_1$-$C_4$alkyl, in particular methyl, and $G_{11}$ and $G_{13}$ are methyl and $G_{12}$ and $G_{14}$ are ethyl or propyl or $G_{11}$ and $G_{12}$ are methyl and $G_{13}$ and $G_{14}$ are ethyl or propyl.

The 4 imino compounds of formula V can be prepared for example according to E. G. Rozantsev, A. V. Chudinov, V. D. Sholle.:lzv. Akad. Nauk. SSSR, Ser. Khim. (9), 2114 (1980), starting from the corresponding 4-oxonitroxide in a condensation reaction with hydroxylamine and subsequent reaction of the OH group. The compounds are described WO 02/100831.

Preference is given to compounds wherein the structural element of formula (II') is of formula A', B' or O',

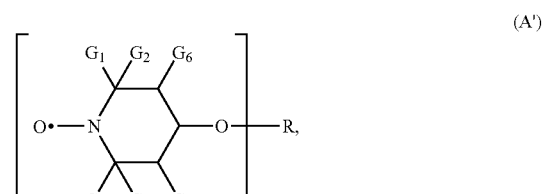

(A')

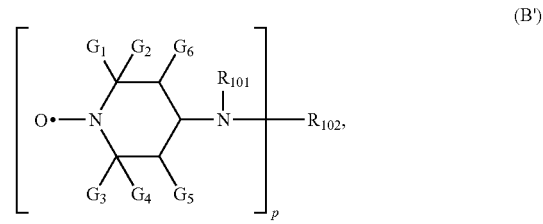

(B')

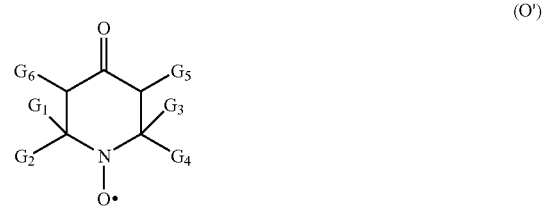

(O')

wherein
m is 1,
R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;
p is 1;
$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;
$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;
$G_6$ is hydrogen and $G_5$ is hydrogen or $C_1$-$C_4$alkyl,
$G_1$ and $G_3$ are methyl and $G_2$ and $G_4$ are ethyl or propyl or $G_1$ and $G_2$ are methyl and $G_3$ and $G_4$ are ethyl or propyl.

Also suitable are the compounds wherein the structural element

is of formula (III')

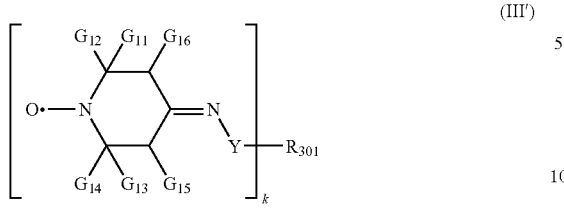

wherein
$G_{11}$, $G_{12}$, $G_{13}$ and $G_{14}$ are independently $C_1$-$C_4$alkyl or $G_{11}$, and $G_{12}$ together and $G_{13}$ and $G_{14}$ together, or $G_{11}$ and $G_{12}$ together or $G_{13}$ and $G_{14}$ together are pentamethylene;
$G_{15}$ and $G_{16}$ are each independently of the other hydrogen or $C_1$-$C_4$alkyl;
k is 1, 2, 3, or 4
Y is O, $NR_{302}$ or when n is 1 and $R_{301}$ represents alkyl or aryl Y is additionally a direct bond;
$R_{302}$ is H, $C_1$-$C_{18}$alkyl or phenyl;
if k is 1
$R_{301}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl;
$C_5$-$C_{12}$cycloalkyl or $C_5$-$C_{12}$cycloalkenyl;
phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;
—C(O)—$C_1$-$C_{36}$alkyl, or an acyl moiety of a □,□-unsaturated carboxylic acid having 3 to 5 carbon atoms or of an aromatic carboxylic acid having 7 to 15 carbon atoms;
—$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$,
wherein $Q^+$ is $H^+$, ammonium or an alkali metal cation;
if k is 2
$R_{301}$ is $C_1$-$C_{18}$alkylene, $C_3$-$C_{18}$alkenylene or $C_3$-$C_{18}$alkinylene, which may be unsubstituted or substituted, by one or more OH, $C_1$-$C_8$alkoxy, carboxy, $C_1$-$C_8$alkoxycarbonyl;
or xylylene; or
$R_{301}$ is a bisacyl radical of an aliphatic dicarboxylic acid having 2 to 36 carbon atoms, or a cycloaliphatic or aromatic dicarboxylic acid having 8-14 carbon atoms;
if k is 3,
$R_{301}$ is a trivalent radical of an aliphatic, cycloaliphatic or aromatic tricarboxylic acid; and
if k is 4, $R_{301}$ is a tetravalent radical of an aliphatic, cycloaliphatic or aromatic tetracarboxylic acid.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl oder n-4-octadecenyl. Preferred is alkenyl with 3 bis 12, particularly preferred with 3 to 6 carbon atoms.

Alkinyl with 3 to 18 is a linear or branched radical as for example propinyl (—$CH_2$—C≡CH), 2-butinyl, 3-butinyl, n-2-octinyl, oder n-2-octadecinyl. Preferred is alkinyl with 3 to 12, particularly preferred with 3 to 6 carbon atoms.

Examples for hydroxy substituted alkyl are hydroxy propyl, hydroxy butyl or hydroxy hexyl.

Examples for halogen substituted alkyl are dichloropropyl, monobromobutyl or trichlorohexyl.

$C_2$-$C_{18}$alkyl interrupted by at least one O atom is for example —$CH_2$—$CH_2$—O—$CH_2$—$CH_3$, —$CH_2$—$CH_2$—O—$CH_3$—or —$CH_2$—$CH_2$—O—$CH_2$—$CH_2$—$CH_2$—O—$CH_2$—$CH_3$—. It is preferably derived from polyethlene glycol. A general description is —(($CH_2)_a$—O$)_b$—H/$CH_3$, wherein a is a number from 1 to 6 and b is a number from 2 to 10.

$C_2$-$C_{18}$alkyl interrupted by at least one $NR_5$ group may be generally described as —(($CH_2)_a$—$NR_5)_b$—H/$CH_3$, wherein a, b and $R_5$ are as defined above.

$C_3$-$C_{12}$cycloalkyl is typically, cyclopropyl, cyclopentyl, methylcyclopentyl, dimethylcyclopentyl, cyclohexyl, methylcyclohexyl or trimethylcyclohexyl.

$C_6$-$C_{10}$ aryl is for example phenyl or naphthyl, but also comprised are $C_1$-$C_4$alkyl substituted phenyl, $C_1$-$C_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

$C_7$-$C_9$phenylalkyl is benzyl, phenylethyl or phenylpropyl.

$C_5$-$C_{10}$heteroaryl is for example pyrrol, pyrazol, imidazol, 2,4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or or β-(3,5-di-tert-butyl-4-hydroxyphenyl)propionyl radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

In particular polymerization process b1) is very suitable. When process b1) is used the nitroxylether according to the structures outlined above splits between the O—X bond. The fragment (E) in formula (I) corresponds then to the O—N fragment and the initiating fragment (In) corresponds to the C centered radical of the group X.

Particularly suitable nitroxylethers and nitroxyl radicals are those of formulae
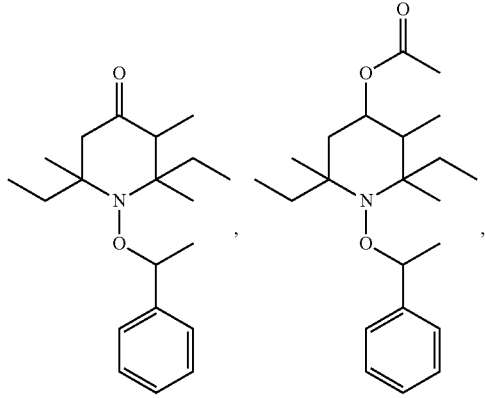
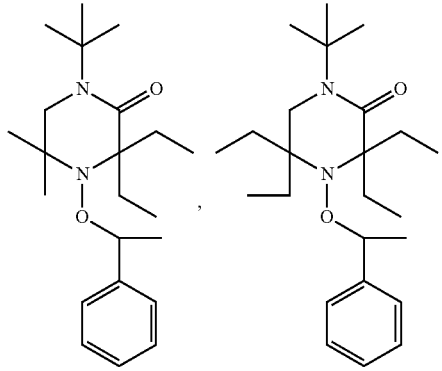
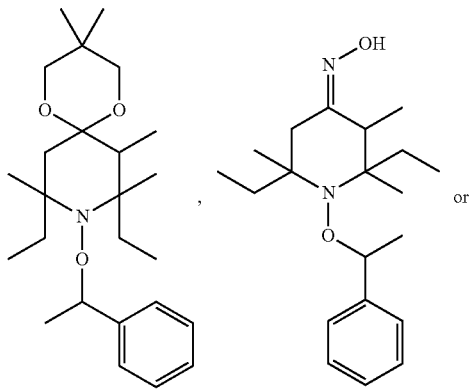
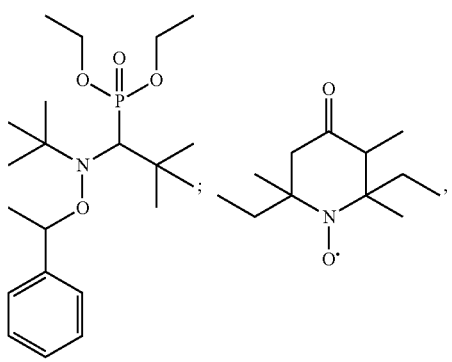
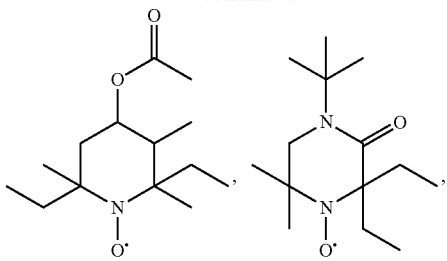
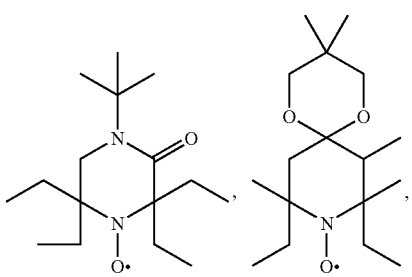
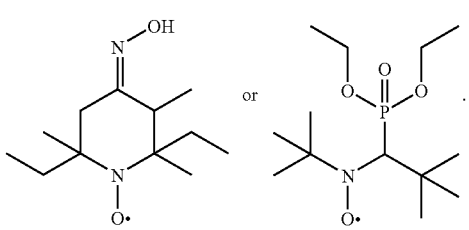
In a very specific embodiment of the invention, the polymeric or copolymeric biodiesel flow improver is prepared with a compound of formula (O1)
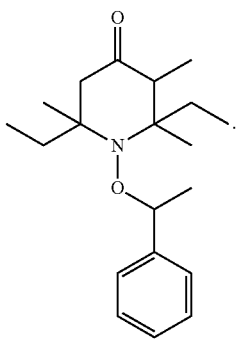
(O1)
In this case the initiating fragment (In) in formula (I) is
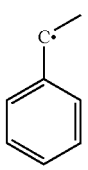

and the group (E) is

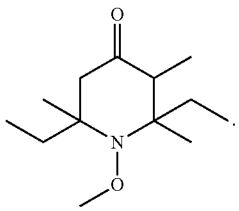 [SMILES: CCC1(C)CC(=O)C(C)C(C)(CC)N1OC]

When the process according to route b2) is chosen, the initiating fragment (In) corresponds to the radical derived from the free radical initiator. The free radical initiator of route b2) is preferably an azo compound, a peroxide, perester or a hydroperoxide.

Suitable azo compounds are commercially available, e.g. 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azo-bis(isobutyramide)dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethyl-pentane), 2,2'-azobis(2-methyl-propane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis (hydroxymethyl)ethyl]propionamide} or 2,2'-azobis{2-methyl-N-[1,1-bis(hydroxymethyl)-2-hydroxyethyl]propionamide}.

Suitable peroxides and hydroperoxides are commercially available, e.g. acetylcyclohexanesulphonyl peroxide, diisopropyl peroxydicarbonate, tert-amyl perneodecanoate, tert-butylperneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclohexane, 1,1-bis(tert-butylperoxy)cyclohexane, tert-butyl peroxyisopropyl carbonate, tert-butyl perisononanoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxide, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

As the polymer or copolymer of the biodiesel fuel composition is a quasi living polymerization the polydispersity will fall between about 1.1 and 2.5, preferably a polydispersity index of 1.0 to 2.2, more preferably from 1.1. to 1.9 and most preferably from 1.1 to 1.5.

Furthermore, the polymer formed (formula I) molecular number (Mn) ranges from about 5,000 to about 100,000, about 5,000 to about 75,0000, about 10,000 to about 50,000 or preferably about 10,000 to about 35,000.

Optional Additives for Biodiesel Fuel Compositions

US 2007/151143, published on Jul. 5, 2007, herein incorporated entirely by reference discusses the addition of an effective amount of a stabilizer selected from the group consisting of the 3-arylbenzofuranone stabilizers and the sterically hindered amine light stabilizers, or an effective amount of a stabilizer selected from the group consisting of the 3-arylbenzofuranone stabilizers and the sterically hindered amine light stabilizers in combination with a stabilizer selected from the group consisting of the hindered phenolic antioxidants.

US2008/0127550, published on Jun. 6, 5, 2008, here incorporated entirely by reference, is aimed at biodiesel fuel (or bio-fuel) compositions, stabilized against the deleterious effects of heat, light, oxygen and metals by an effective amount of a combination of one or more compounds selected from the group consisting of the sterically hindered phenolic antioxidants and one or more compounds selected from the group consisting of the triazole metal deactivators.

Thus additional additives directed to stabilizing the composition against the deleterious effects of heat, light and oxygen as well as metal exposure may optionally be combined with the present biofuel composition (components a) and b)).

3-arylbenzofuranones

The 3-arylbenzofuranones antioxidants are for example those disclosed in U.S. Pat. No. 4,325,863; U.S. Pat. No. 4,388,244; U.S. Pat. No. 5,175,312; U.S. Pat. No. 5,252,643; U.S. Pat. No. 5,216,052; U.S. Pat. No. 5,369,159; U.S. Pat. No. 5,488,117; U.S. Pat. No. 5,356,966; U.S. Pat. No. 5,367,008; U.S. Pat. No. 5,428,162; U.S. Pat. No. 5,428,177; and U.S. Pat. No. 5,516,920; which are hereby incorporated by reference.

The following compounds are examples of the benzofuran-2-one type which are particularly suitable in the composition of the present invention: 3-[4-(2-acetoxyethoxy)phenyl]-5,7-di-tert-butyl-benzofuran-2-one; 5,7-di-tert-butyl-3-[4-(2-stearoyloxyethoxy)phenyl]benzofuran-2-one; 3,3'-bis[5,7-di-tert-butyl-3-(4-[2-hydroxyethoxy]phenyl)benzofuran-2-one]; 5,7-di-tert-butyl-3-(4-ethoxyphenyl)benzofuran-2-one; 3-(4-acetoxy-3,5-dimethylphenyl)-5,7-di-tert-butylbenzofuran-2-one; 3-(3,5-dimethyl-4-pivaloyloxyphenyl)-5,7-di-tert-butyl-benzofuran-2-one; 5,7-di-tert-butyl-3-phenylbenzofuran-2-one; 5,7-di-tert-butyl-3-(3,4-dimethylphenyl)-benzofuran-2-one; 5,7-di-tert-butyl-3-(2,3-dimethylphenyl)benzofuran-2-one.

Also of special interest is a composition containing at least one compound of the formula V

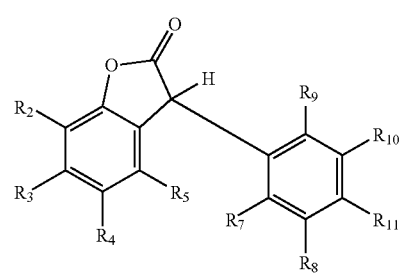

in which
R$_2$ is hydrogen or C$_1$-C$_6$alkyl,
R$_3$ is hydrogen,
R$_4$ is hydrogen or C$_1$-C$_6$alkyl,
R$_5$ is hydrogen,
R$_7$, R$_8$, R$_9$, R$_{10}$ and R$_{11}$ independently of one another are hydrogen, C$_1$-C$_4$alkyl or C$_1$-C$_4$alkoxy, with the proviso that at least two of the radicals R$_7$, R$_8$, R$_9$, R$_{10}$ or R$_{11}$ are hydrogen.

Very particular preference is given to a composition containing at least one compound of the formula Va or Vb

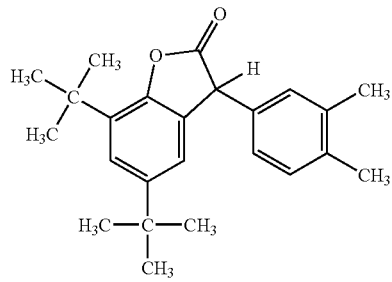

(Va)

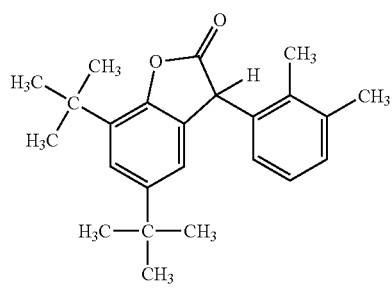

(Vb)

or a mixture of the two compounds of the formula Va and Vb.

Optional Hindered Amine Stabilizers

The hindered amines are disclosed for example in U.S. Pat. Nos. 5,004,770, 5,204,473, 5,096,950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584 and 6,472,456, and U.S. application Ser. No. 09/714,717, filed Nov. 16, 2000 and Ser. No. 10/485,377, filed Aug. 6, 2002. The relevant disclosures of these patents and applications are hereby incorporated by reference.

U.S. Pat. Nos. 6,271,377, 6,392,041 and 6,376,584, cited above disclose hindered hydroxyalkoxyamine stabilizers.

Suitable hindered amines include for example:

1) 1-cyclohexyloxy-2,2,6,6-tetramethyl-4-octadecylaminopiperidine,
2) bis(2,2,6,6-tetramethylpiperidin-4-yl)sebacate,
3) bis(1-acetoxy-2,2,6,6-tetramethylpiperidin-4-yl)sebacate,
4) bis(1,2,2,6,6-pentamethyl-4-yl)sebacate,
5) bis(1-cyclohexyloxy-2,2,6,6-tetramethylpiperidin-4-yl) sebacate,
6) bis(1-octyloxy-2,2,6,6-tetramethylpiperidin-4-yl)sebacate;
7) bis(1-acyl-2,2,6,6-tetramethylpiperidin-4-yl)sebacate,
8) bis(1,2,2,6,6-pentamethyl-4-piperidyl)n-butyl-3,5-di-tert-butyl-4-hydroxybenzylmalonate
9) 2,4-bis[(1-cyclohexyloxy-2,2,6,6-tetramethylpiperidin-4-yl)butylamino]-6-(2-hydroxyethylamino-s-triazine,
10) bis(1-cyclohexyloxy-2,2,6,6-tetramethylpiperidin-4-yl) adipate,
11) 2,4-bis[(1-cyclohexyloxy-2,2,6,6-piperidin-4-yl)butylamino]-6-chloro-s-triazine,
12) 1-(2-hydroxy-2-methylpropoxy)-4-hydroxy-2,2,6,6-tetramethylpiperidine,
13) 1-(2-hydroxy-2-methylpropoxy)-4-oxo-2,2,6,6-tetramethylpiperidine,
14) 1-(2-hydroxy-2-methylpropoxy)-4-octadecanoyloxy-2,2,6,6-tetramethylpiperidine,
15) bis(1-(2-hydroxy-2-methylpropoxy)-2,2,6,6-tetramethylpiperidin-4-yl) sebacate,
16) bis(1-(2-hydroxy-2-methylpropoxy)-2,2,6,6-tetramethylpiperidin-4-yl)adipate,
17) 2,4-bis{N-[1-(2-hydroxy-2-methylpropoxy)-2,2,6,6-tetramethylpiperidin-4-yl]-N-butylamino}-6-(2-hydroxyethylamino)-s-triazine,
18) 4-benzoyl-2,2,6,6-tetramethylpiperidine,
19) di-(1,2,2,6,6-pentamethylpiperidin-4-yl)p-methoxybenzylidenemalonate,
20) 4-stearyloxy-2,2,6,6-tetramethylpiperidine,
21) bis(1-octyloxy-2,2,6,6-tetramethylpiperidyl)succinate,
22) 1,2,2,6,6-pentamethyl-4-aminopiperidine,
23) 2-undecyl-7,7,9,9-tetramethyl-1-oxa-3,8-diaza-4-oxospiro[4,5]decane,
24) tris(2,2,6,6-tetramethyl-4-piperidyl)nitrilotriacetate,
25) tris(2-hydroxy-3-(amino-(2,2,6,6-tetramethylpiperidin-4-yl)propyl) nitrilotriacetate,
26) tetrakis(2,2,6,6-tetramethyl-4-piperidyl)-1,2,3,4-butane-tetracarboxylate,
27) tetrakis(1,2,2,6,6-pentamethyl-4-piperidyl)-1,2,3,4-butane-tetracarboxylate,
28) 1,1'-(1,2-ethanediyl)-bis(3,3,5,5-tetramethylpiperazinone),
29) 3-n-octyl-7,7,9,9-tetramethyl-1,3,8-triazaspiro[4.5]decan-2,4-dione,
30) 8-acetyl-3-dodecyl-7,7,9,9-tetramethyl-1,3,8-triazaspiro [4.5]decane-2,4-dione,
31) 3-dodecyl-1-(2,2,6,6-tetramethyl-4-piperidyl)pyrrolidin-2,5-dione,
32) 3-dodecyl-1-(1,2,2,6,6-pentamethyl-4-piperidyl)pyrrolidine-2,5-dione,
33) N,N'-bis-formyl-N,N'-bis(2,2,6,6-tetramethyl-4-piperidyl)hexamethylenediamine,
34) the reaction product of 2,4-bis[(1-cyclohexyloxy-2,2,6,6-piperidin-4-yl)-butylamino]-6-chloro-s-triazine with N,N'-bis(3-aminopropyl)ethylenediamine),
35) the condensate of 1-(2-hydroxyethyl)-2,2,6,6-tetramethyl-4-hydroxypiperidine and succinic acid,
36) linear or cyclic condensates of N,N'-bis(2,2,6,6-tetramethyl-4-piperidyl)-hexamethylenediamine and 4-tert-octylamino-2,6-dichloro-1,3,5-triazine,
37) linear or cyclic condensates of N,N'-bis(2,2,6,6-tetramethyl-4-piperidyl)-hexamethylenediamine and 4-cyclohexylamino-2,6-dichloro-1,3,5-triazine,
38) linear or cyclic condensates of N,N'-bis-(2,2,6,6-tetramethyl-4-piperidyl)-hexamethylenediamine and 4-morpholino-2,6-dichloro-1,3,5-triazine,
39) linear or cyclic condensates of N,N'-bis-(1,2,2,6,6-pentamethyl-4-piperidyl)hexamethylenediamine and 4-morpholino-2,6-dichloro-1,3,5-triazine,
40) the condensate of 2-chloro-4,6-bis(4-n-butylamino-2,2,6,6-tetramethylpiperidyl)-1,3,5-triazine and 1,2-bis(3-aminopropylamino)ethane,
41) the condensate of 2-chloro-4,6-di-(4-n-butylamino-1,2,2,6,6-pentamethylpiperidyl)-1,3,5-triazine and 1,2-bis-(3-aminopropylamino)ethane,
42) a reaction product of 7,7,9,9-tetramethyl-2-cycloundecyl-1-oxa-3,8-diaza-4-oxospiro[4,5]decane and epichlorohydrin,
43) poly[methyl, (3-oxy-(2,2,6,6-tetramethylpiperidin-4-yl) propyl)]siloxane, CAS#182635-99-0,
44) reaction product of maleic acid anhydride-$C_{18}$-$C_{22}$-□-olefin-copolymer with 2,2,6,6-tetramethyl-4-aminopiperidine,
45) the oligomeric compound which is the condensation product of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine, 46) the oligomeric compound which is the condensation product of 4,4'-hexamethylenebis(amino-1,2,2,6,6-pentaamethylpiperidine) and 2,4-dichloro-6-[(1,2,2,6,6-pentaamethylpiperidin-4-yl)butylamino]-s-triazine end-capped with 2-chloro-4,6-bis(dibutylamino)-s-triazine, 47) the oligomeric compound which is the condensation product of 4,4'-hexa-methylenebis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine, 48) the oligomeric compound which is the condensation product of 4,4'-hexa-methylenebis(amino-1-acyloxy-2,2,6,6-tetramethylpiperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine and 49) product obtained by reacting a product, obtained by reacting 1,2-bis(3-aminopropylamino)ethane with cyanuric chloride, with (2,2,6,6-tetramethylpiperidin-4-yl)butylamine.

Also included are the sterically hindered N—H, N-methyl, N-methoxy, N-propoxy, N-octyloxy, N-cyclohexyloxy, N-acyloxy and N-(2-hydroxy-2-methylpropoxy) analogues of any of the above mentioned compounds. For example, replacing an N—H hindered amine with an N-methyl hindered amine would be employing the N-methyl analogue in place of the N—H.

Each of the 3-arylbenzofuranone and hindered amine light stabilizers, are employed at levels of about 5 ppm to about 5000 ppm, for example from about 50 ppm to about 5000 ppm, for example from about 100 to about 5000 ppm by weight, based on the weight of the biodiesel fuel. For example, each of the present additives are present from about 150 to about 4000 ppm, from about 200 to about 3000 ppm, or from about 250 to about 2500 ppm by weight, based on the weight of the biodiesel fuel. In certain instances, the levels may be as high as about 1%, about 2% or about 3% by weight, based on the weight of the biodiesel fuel.

Optional Hindered Phenolic Antioxidants

The hindered phenolic antioxidants are for example 1.1. Alkylated monophenols, for example 2,6-di-tert-butylphenol, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(□-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example □-tocopherol, □-tocopherol, □-tocopherol, □-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2, 2'-methylenebis (6-tert-butyl-4-methylphenol), 2,2'-methylenebis(6-tert-butyl-4-ethylphenol), 2,2'-methylenebis[4-methyl-6-(□-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(□-methylbenzyl)-4-nonylphenol], 2,2'-methylenebis[6-(□□-dimethylbenzyl)-4-nonylphenol], 4,4'-methylenebis(2, 6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. Benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl)isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4- tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

For example, the present hindered phenolic compounds are selected from butylated phenol, butylated hydroxytoluene, butylated hydroxyanisole, tocopherol, benzylphosphonates, esters of □-(3,5-di-tert-butyl-4-hydroxyphenyl)propionic acid with mono- or polyhydric alcohols, esters of □-(5-tert-butyl-4-hydroxy-3-methylphenyl)propionic acid with mono- or polyhydric alcohols, esters of □-(3,5-dicyclohexyl-4-hydroxyphenyl)propionic acid with mono- or polyhydric alcohols and esters of 3,5-di-tert-butyl-4-hydroxyphenyl acetic acid with mono- or polyhydric alcohols.

For instance, the present hindered phenolic compounds are selected from 2,6-di-tert-butylphenol, 2,6-di-tert-butyl-4-methylphenol (BHT), 2,2'-methylene bis-(4,6-di-tert-butylphenol), 1,6-hexamethylene-bis-(3,5-di-tert-butyl-4-hydroxyhydrocinnamate), ((3,5-bis(1,1-dimethylethyl)-4-hydroxyphenyl)methylthio)acetic acid $C_{10}$-$C_{14}$ isoalkyl esters, 3,5-di-tert-butyl-4-hydroxyhydrocinnamic acid $C_6$-$C_9$alkyl esters, 3,5-di-tert-butyl-4-hydroxyhydrocinnamic acid methyl ester, tetrakis-(3-(3,5-di-tert-butyl-4-hydroxyphenyl)-propionyloxymethyl)methane, thiodiethylene bis(3,5-di-tert-butyl-4-hydroxyhydrocinnamate), octadecyl 3,5-di-tert-butyl-4-hydroxyhydrocinnamate and 2,5-di-tert-butylhydroquinone.

For example, the present hindered phenolic antioxidants are selected from 2,6-di-tert-butylphenol, 3,5-di-tert-butyl-4-hydroxyhydrocinnamic acid methyl ester and tetrakis-(3-(3,5-di-tert-butyl-4-hydroxyphenyl)-propionyloxymethyl)methane.

Metal Deactivators

The triazole metal deactivators are of the 1,2,4-triazole class or the benzotriazole class.

Metal deactivators of the 1,2,4-triazole class are disclosed for example in U.S. Pat. No. 4,734,209, the disclosure of which is hereby incorporated by reference.

1-(or 4)-(dimethylaminomethyl)triazole,
1-(or 4)-(diethylaminomethyl)triazole,
1-(or 4)-(di-isopropylaminomethyl)triazole,
1-(or 4)-(di-n-butylaminomethyl)triazole,
1-(or 4)-(di-n-hexylaminomethyl)triazole,
1-(or 4)-(di-isooctylaminomethyl)triazole,
1-(or 4)-(di-(2-ethylhexyl)aminomethyl)triazole,
1-(or 4)-(di-n-octylaminomethyl)triazole,
1-(or 4)-(di-n-decylaminomethyl)triazole,
1-(or 4)-(di-n-dodecylaminomethyl)triazole,
1-(or 4)-(di-n-octadecylaminomethyl)triazole,
1-(or 4)-(di-n-eicosylaminomethyl)triazole,
1-(or 4)-[di-(prop-2'-enyl)aminomethyl]triazole,
1-(or 4)-[di-(but-2'-enyl)aminomethyl]triazole,
1-(or 4)-[di-(eicos-2'-enyl)aminomethyl]triazole,
1-(or 4)-(di-cyclohexylaminomethyl)triazole,
1-(or 4)-(di-benzylaminomethyl)triazole,
1-(or 4)-(di-phenylaminomethyl)triazole,
1-(or 4)-(4'-morpholinomethyl)triazole,
1-(or 4)-(1'-pyrrolidinomethyl)triazole,
1-(or 4)-(1'-piperidinomethyl)triazole,
1-(or 4)-(1'-perhydroroazepinomethyl)triazole,
1-(or 4)-(2',2"-dihydroxyethyl)aminomethyl]triazole,
1-(or 4)-(dibutoxypropyl-aminomethyl)triazole,
1-(or 4)-(dibutylthiopropyl-aminomethyl)triazole,
1-(or 4)-(di-butylaminopropyl-aminomethyl)triazole,
N,N-bis-(1- or 4-triazolylmethyl)laurylamine,
N,N-bis-(1- or 4-triazolylmethyl)oleylamine,
N,N-bis-(1- or 4-triazolylmethyl)ethanolamine and
N,N,N',N'-tetra(1- or 4-triazolylmethyl)ethylene diamine.

The present compound of formula (I) is for example 1-(di-isooctylaminomethyl)triazole, that is 1-(di-isooctylaminomethyl)-1,2,4-triazole, or is 1-(di-(2-ethylhexyl)aminomethyl) 1,2,4-triazole.

The benzotriazole metal deactivators are for example those disclosed in U.S. Pat. Nos. 5,032,300 and 5,171,463, the disclosures of which are hereby incorporated by reference.

Specific examples of benzotriazole compounds include:
1-(2-methoxyprop-2-yl)tolyltriazole,
1-(1-methoxyethyl)tolyltriazole,
1-(1-methoxypropyl)tolyltriazole,
1-(1-isobutoxybutyl)tolyltriazole,
1-(1-tert-butoxybutyl)tolyltriazole,
1-(1-hexyloxybutyl)tolyltriazole,
1-(1-octyloxybutyl)tolyltriazole,
1-(1-butoxy-2-methylpropyl)tolyltriazole,
1-(1-dodecyloxybutyl)tolyltriazole,
1-(1-isopropyloxyethyl)tolyltriazole,
1-(1-isopropyloxypropyl)tolyltriazole,
1-(1-isopropyloxybutyl)tolyltriazole,
1-(1-cyclohexyloxypropyl)tolyltriazole,
1-(1-cyclohexyloxyheptyl)tolyltriazole,
1-(1-cyclohexyloxybutyl)tolyltriazole,
1-[1-(2-methoxyethoxy)butyl]tolyltriazole and
1-[1-(2-ethoxyethoxy)butyl]tolyltriazole.

The present compound of formula (III) is for example
1-(2-methoxyprop-2-yl)tolyltriazole,
1-(1-cyclohexyloxypropyl)tolyltriazole, 1-(1-cyclohexyloxyheptyl)tolyltriazole or
1-(1-cyclohexyloxybutyl)tolyltriazole.
(1-(2-methoxyprop-2-yl)tolyltriazole is

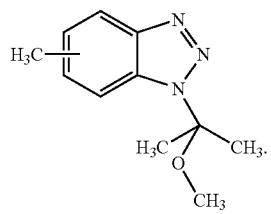

1-(1-cyclohexyloxyheptyl)tolyltriazole is

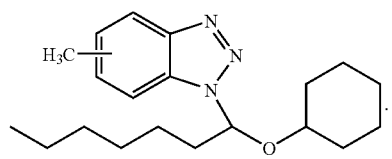

The benzotriazole metal deactivators may also be for example those disclosed in U.S. Pat. Nos. 5,580,482 and 6,410,490, the disclosures of which are hereby incorporated by reference.

Additional benzotriazoles are for example
4-(or 5)-methyl-1-(di(2-ethylhexyl)-aminomethyl)-benzotriazole,
4-(or 5)-methyl-1-(dimethylaminomethyl)-benzotriazole,
4-(or 5)-methyl-1-(diethylaminomethyl)-benzotriazole,
4-(or 5)-methyl-1-(di-isopropylaminomethyl)-benzotriazole,
4-(or 5)-methyl-1-(di-n-butylaminomethyl)-benzotriazole,
4-(or 5)-methyl-1-(di-n-hexylaminomethyl)-benzotriazole,
4-(or 5)-methyl-1-(di-isooctylaminomethyl)-benzotriazole,
4-(or 5)-methyl-1-(di-n-octylaminomethyl)-benzotriazole,
4-(or 5)-methyl-1-(di-n-decylaminomethyl)-benzotriazole,
4-(or 5)-methyl-1-(di-n-dodecylaminomethyl)-benzotriazole,
4-(or 5)-methyl-1-(di-n-octadecylaminomethyl)-benzotriazole,
4-(or 5)-methyl-1-(di-n-eicosylaminomethyl)-benzotriazole,
4-(or 5)-methyl-1-[di-(prop-2'-enyl)aminomethyl]-benzotriazole,
4-(or 5)-methyl-1-[di-(but-2'-enyl)aminomethyl]-benzotriazole,
4-(or 5)-methyl-1-[di-(eicos-2'-enyl)aminomethyl]-benzotriazole,
4-(or 5)-methyl-1-(di-cyclohexylaminomethyl)-benzotriazole,
4-(or 5)-methyl-1-(di-benzylaminomethyl)-benzotriazole,
4-(or 5)-methyl-1-(di-phenylaminomethyl)-benzotriazole,
4-(or 5)-methyl-1-(4'-morpholinomethyl)-benzotriazole,
4-(or 5)-methyl-1-(1'-pyrrolidinomethyl)-benzotriazole,
4-(or 5)-methyl-1-(1'-piperidinomethyl)-benzotriazole,
4-(or 5)-methyl-1-(1'-perhydroroazepinomethyl)-benzotriazole,
4-(or 5)-methyl-1-(2',2"-dihydroxyethyl)aminomethyl]-benzotriazole,
4-(or 5)-methyl-1-(dibutoxypropyl-aminomethyl)-benzotriazole,
4-(or 5)-methyl-1-(dibutylthiopropyl-aminomethyl)-benzotriazole and
4-(or 5)-methyl-1-(di-butylaminopropyl-aminomethyl)-benzotriazole.

The present benzotriazoles of formula (IV) are for example
4-(or 5)-methyl-1-(di(2-ethylhexyl)-aminomethyl)-benzotriazole or 4-(or 5)-methyl-1-(di-isooctylaminomethyl)-benzotriazole.

Hindered phenolics and metal deactivators (triazoles or benzotriazol) may be employed at levels of about 5 ppm to about 5000 ppm, for example from about 50 ppm to about 5000 ppm, for example from about 100 to about 5000 ppm by weight, based on the weight of the biodiesel fuel. For example, each of the present additives are present from about 150 to about 4000 ppm, from about 200 to about 3000 ppm, or from about 250 to about 2500 ppm by weight, based on the weight of the biodiesel fuel. In certain instances, the levels may be as high as about 1%, about 2% or about 3% by weight, based on the weight of the biodiesel fuel.

Stabilized biodiesel fuels exhibit increased storage stability vs. unstabilized samples. Degradation of biodiesel fuels under the conditions of heat, light, oxygen or metals is observed by the formation of carboxylic acids, peroxides, aldehydes and alcohols. Degradation under the conditions of metals means metal contamination.

EXAMPLES

Compound O1

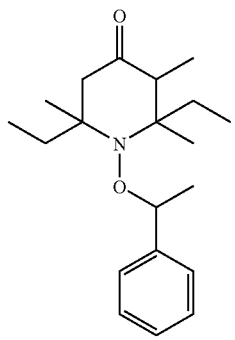 [SMILES: CCC1(C)CC(=O)C(C)C(C)(CC)N1OC(C)c1ccccc1]

is prepared according to example 24 of GB 2335190

Example 1

Poly 2-ethylhexylacrylate Formed by Nitroxyl Mediated CFRP

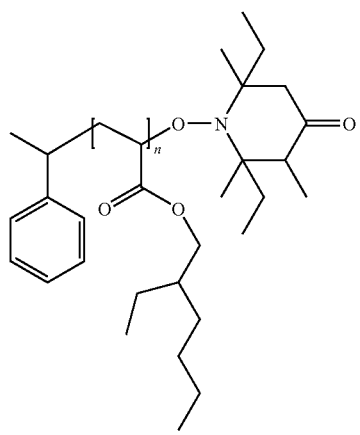

50 grams of ethylhexylacrylate is added to a 200 ml flask. 0.57 grams of nitroxyl compound O1 is then added. The clear mixture is degassed under vacuum for 1 minute followed by degassing with N2 for 2 minutes (3 cycles). The degassed mixture is heated and stirred at 135° C. The reaction is followed by monitoring the solids content (SC). After 270 minutes the solid content is ~50% and the molecular weight is determined using GPC with Polymethylmethacrylate standard (PMMA). The Mn is ca. 14500 or n=77.

Example 2

Poly(2-ethylhexylacrylate-b-laurylacrylate)

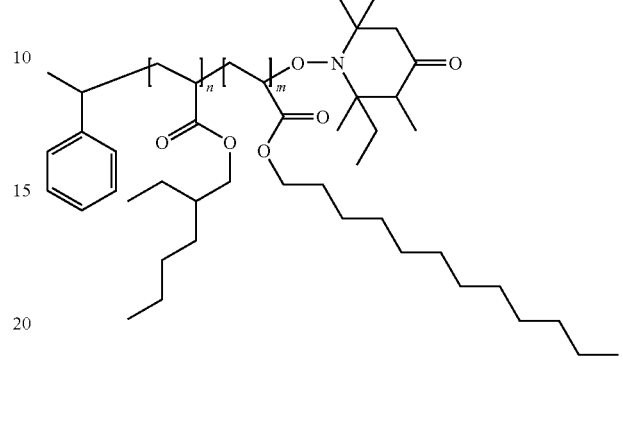

49.98 grams of polymer formed in example 1 is combined with 33.19 g of lauryl acrylate (FLUKA) in a 200 ml. flask to form a homogenous yellowish clear mixture. The clear mixture is degassed under vacuum for 1 minute followed by degassing with N₂ for 2 minutes (3 cycles). The degassed mixture is heated and stirred at 135° C. The reaction is followed by monitoring the solids content (SC). After 90 minutes, the reaction temperature is raised to 140° C. and the SC are sampled after 150 minutes. The temperature is then raised to 145° C. and the SC are then sampled every 30 minutes until a target of 80% SC is achieved. GPC using THF and PMMA Standard. Mn=12,980 g/mol; PD=1.35), clear amber liquid.

TABLE 1

Additional Polymers and Copolymers Prepared Similarly as in Examples 1 and 2 above

| EX | Polymer or Copolymer | n:m:o:p | Theoretical $M_n$ |
|----|---------------------|---------|-------------------|
| 3  |                     | 77:20:0:0 | 17100           |

TABLE 1-continued
Additional Polymers and Copolymers Prepared Similarly as in Examples 1 and 2 above
| EX | Polymer or Copolymer | n:m:o:p | Theoretical $M_n$ |
|---|---|---|---|
| 4 | 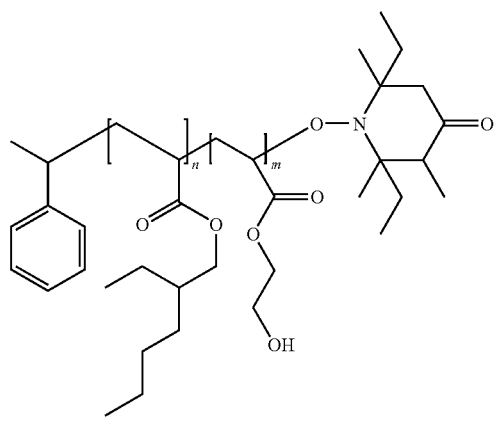 | 77:20:0:0 | 16800 |
| 5 | 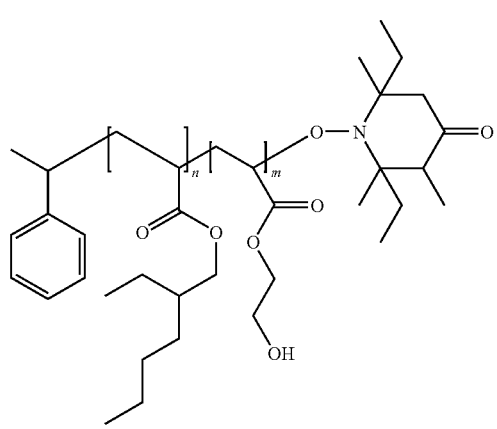 | 77:10:0:0 | 15700 |
| 6 | 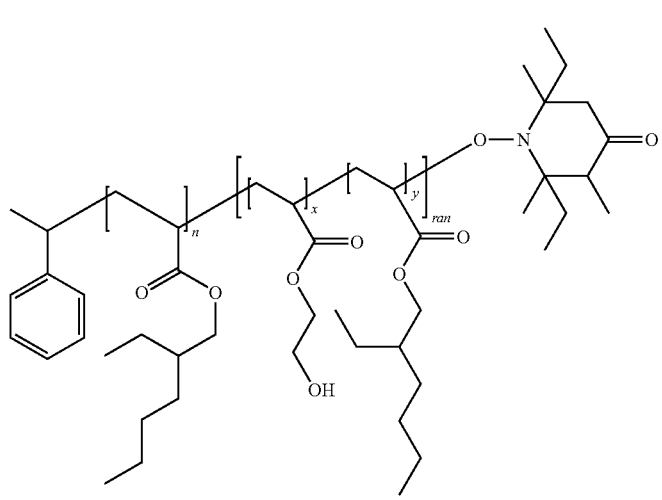 | 77:10:0:0* | 16000 |

TABLE 1-continued

Additional Polymers and Copolymers Prepared Similarly as in Examples 1 and 2 above

| EX | Polymer or Copolymer | n:m:o:p | Theoretical $M_n$ |
|----|---------------------|---------|-------------------|
| 7  |                     | 77:20:0:0 | 17400 |
| 8  |                     | 77:10:0:0 | 15700 |
| 9  |                     | 77:10:0:0 | 17400 |

TABLE 1-continued

Additional Polymers and Copolymers Prepared Similarly as in Examples 1 and 2 above

| EX | Polymer or Copolymer | n:m:o:p | Theoretical $M_n$ |
|---|---|---|---|
| 10 | | 77:10:0:0 | 14800 |
| 11 | | 77:20:0:0 | 16500 |
| 12 | | 60:0:0:0 | 10200 |
| 13 | | 61:10:0:0 | 16000 |

TABLE 1-continued

Additional Polymers and Copolymers Prepared Similarly as in Examples 1 and 2 above

| EX | Polymer or Copolymer | n:m:o:p | Theoretical $M_n$ |
|---|---|---|---|
| 14 | | 60:0:0:0 | 14700 |
| 15 | | 67:10:0:0 | 17600 |

*ran means random block formed from 2-hydroxyethylacrylate and 2-ethylhexyl acrylate.
This random block is equivalent to m.

Example 16

Poly(n-butylacrylate-b-dimethylaminopropyl-methacrylamide)

2460 g of poly(n-butyl acrylate) (Mn=5800) is prepared in a similar fashion as in example 1, is added to a 5 L reactor followed by 1700 g of dimethylaminopropylmethacrylamide.

The clear mixture is degassed under vacuum followed by degassing with N2 (3 cycles). The degassed mixture is heated and stirred at 145 C. The reaction is followed by monitoring the solids content (SC). When the solids content reaches 75% the reaction is stopped and the molecular weight is measured by GPC. Mn=7500.

Transesterification Modifications of Example 16

Examples 17-22 are formed from the starting block copolymer of example 16 by transesterifying the butylacrylate monomer units with various alcohols or mixtures of alcohols as described in example 17.

Example 17

The block copolymer of example 16 polymer is transesterified with pure stearyl alcohol at 150° C./50 mbar in the presence of titanium(IV) diisopropoxide bis(acetylacetonate) catalyst forming a terpolymer poly[(butylacrylate-co-stearylacrylate)-b-dimethylaminopropylmethacrylate].

29.7 g of the polymer formed in example 16 and 27.22 g of stearyl alcohol are added to a 100 mL flask. The homogenous yellow mixture is heated under vacuum for 1 hour at 140° C. to remove traces of water. 0.6683 g of the Ti catalyst is added and the reaction temperature is raised to 150° C. After 1 hour, 0.6450 g of Titanium catalyst is additionally added and the reaction is continued. After the second hour, an additional 0.6450 g of Titanium catalyst is added and the reaction continued for a total of three hours. Mn=11,700.

Example 18

Copolymer of example 16 is transesterified with stearyl alcohol (NAFOL 1618s) to give the copolymer of example 18.

Examples 19-21

Copolymer of example 16 is transesterified with mixtures of partly branched $C_{12}$-$C_{15}$ alcohol (LIAL 125A and stearyl alcohol (NAFOL 1618s) to give the copolymers of examples 19-21. The copolymers differ by the molar amounts of $C_{12}$-$C_{15}$ alcohol (LIAL 125A) and stearyl alcohols (ratio of n:o).

Example 22

Copolymer of example 16 is transesterified with $C_{12}$-$C_{15}$ alcohol (LIAL 125A) to give the copolymer of example 22.

Examples 23-26

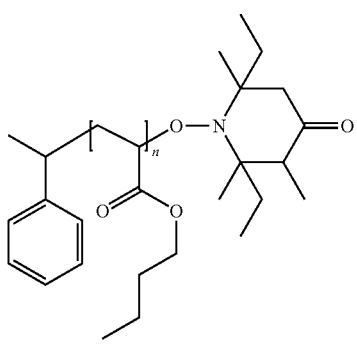

The poly butyl acrylate above (n=77) is transesterified with mixtures of $C_{12}$-$C_{15}$ alcohol (NEODOL 25E), stearyl alcohol (AFOL 1618s) and monomethylpolyethyleneglycol (MW=500) at varying ratios to give the copolymers of examples 23 thru 26. The reaction conditions are virtually the same as that described in example 17.

29.95 g of poly n-butyl acrylate, 9.27 g of stearyl alcohol, 23.73 g of Neodol 25E and 8.87 g of M(PEG 500) were added to a 100 mL round bottom flask. The homogenous yellow mixture was heated under vacuum for 1 hour at 140° C. to remove trace amounts of water. 0.8214 g (1 mol %) of Ti-catalyst was added and the reaction temperature was raised to 150° C. After 1 and 2 hours of reaction an additional 1 mol % of Ti-catalyst was added. (total 3 mol %). The mixture was allowed to react for 3 hours total.

TABLE 2

| EX | Polymer or Copolymer | n:m:o:p | Theoretical $M_n$ |
|----|----------------------|---------|-------------------|
| 16 |                      | 77:17:0:0 | 13050 |
| 17 |                      | 58:17:19:0 | 22900 |

TABLE 2-continued
| EX | Polymer or Copolymer | n:m:o:p | Theoretical $M_n$ |
|---|---|---|---|
| 18 | 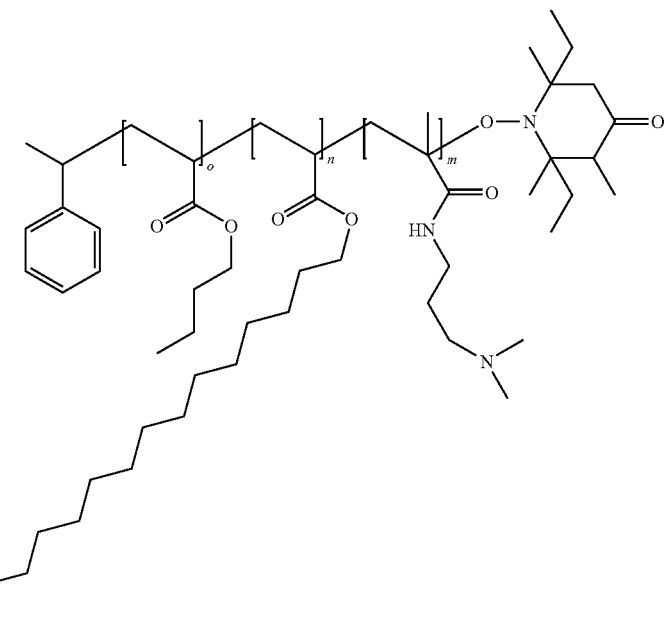 | 58:17:19:0 | 22900 |
| 19 | 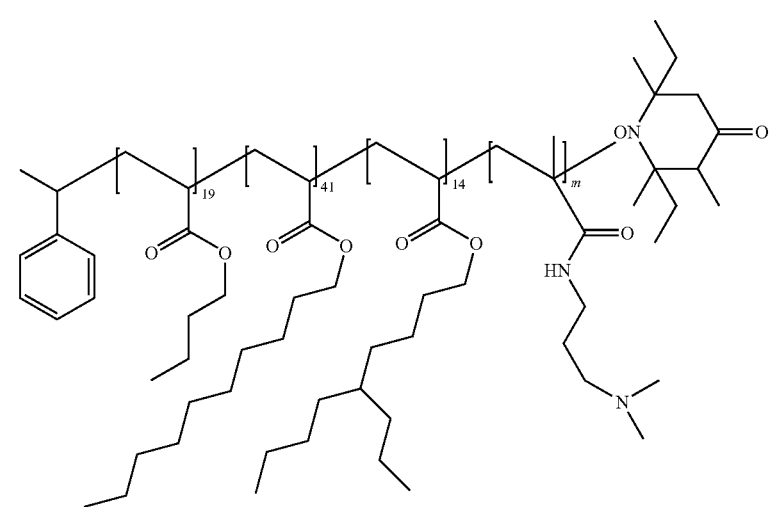 | 19:44:14:17 | 22400 |

TABLE 2-continued
| EX | Polymer or Copolymer | n:m:o:p | Theoretical $M_n$ |
|---|---|---|---|
| 20 | 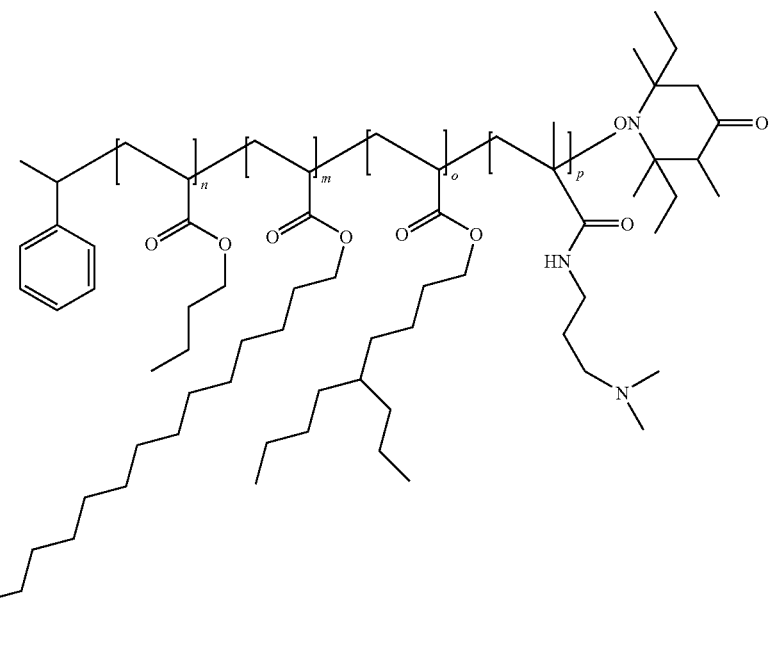 | 19:29:29:17 | 21800 |
| 21 | 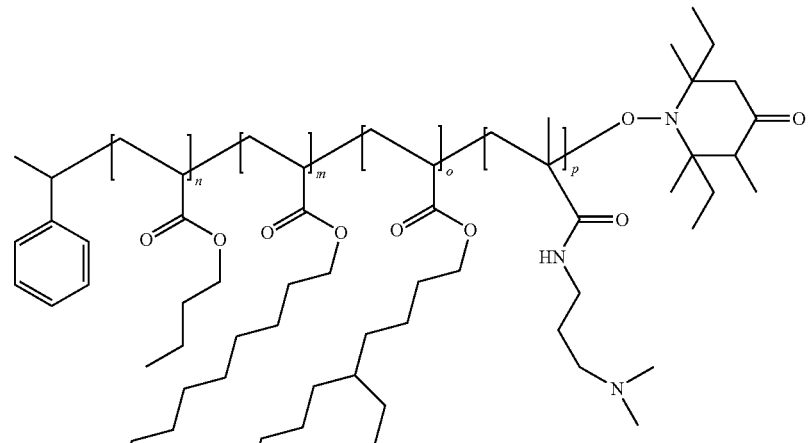 | 19:14:44:17 | 21300 |

TABLE 2-continued
| EX | Polymer or Copolymer | n:m:o:p | Theoretical $M_n$ |
|---|---|---|---|
| 22 | 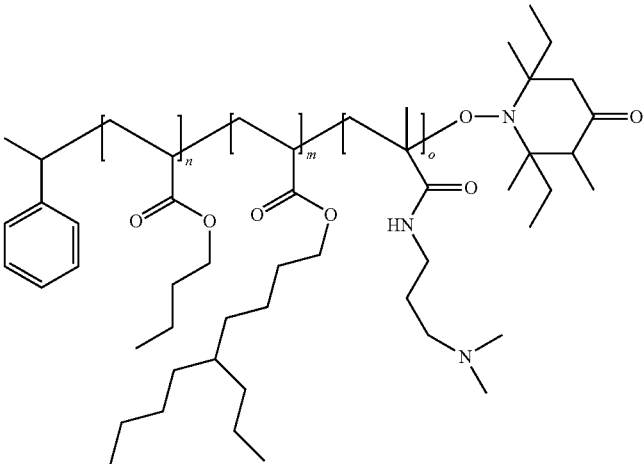 | 19:58:17:0 | 20800 |
| 23 | 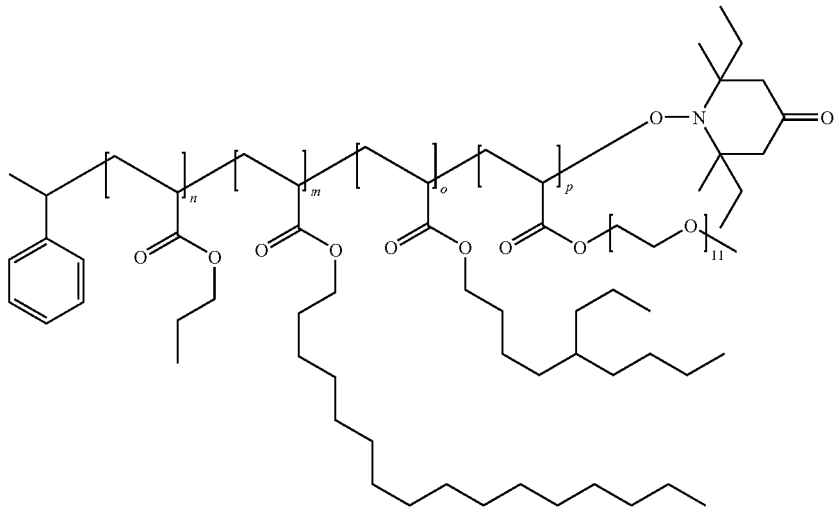 | 19:10:30:17 | 23200 |
| 24 | 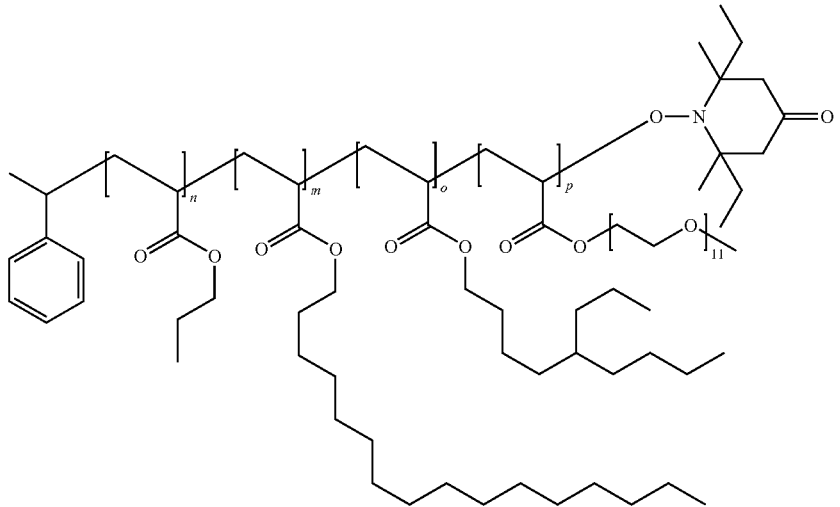 | 19:12:35:12 | 22200 |

TABLE 2-continued

| EX | Polymer or Copolymer | n:m:o:p | Theoretical $M_n$ |
|---|---|---|---|
| 25 | | 19:13:39:6 | 23200 |
| 26 | | 19:9:26:23 | 25300 |

Application Results

A number of the polymers formed above are tested for their effective as cold flow improvers in biodiesel.

Untreated biodiesel treated is derived from soybean oil and typically has a cold filter plugging point of 0 to 3° C.

The Table 1 shows the change in degrees centigrade for the cold filter plugging point for the biodiesel derived from soybean and treated with 2 wt. % of the polymers of the invention. The control is untreated a soy based biodiesel oil.

The cold filter plugging point is determined by ASTM standard D6371.

It is to be expected that the polymers tested below in soybean biodiesel would also be effective in other biodiesel sources such as rapeseed and palm.

TABLE 1

| CHEMICAL CLASS | Δ ° C. |
|---|---|
| Biodiesel derived from soy | 0.0 |
| Example 18 | −0.1 |

TABLE 1-continued

| CHEMICAL CLASS | Δ ° C. |
|---|---|
| Example 17 | −2.1 |
| Polystyrene-poly alkyl acrylates copolymer | −3.5 |
| Polystyrene-poly alkyl acrylates copolymer | −4.0 |
| Example 21 | −4.1 |
| Poly alkyl acrylate | −4.6 |
| Polystyrene-poly alkyl acrylates copolymer | −4.9 |
| Example 9 | −5.6 |
| Example 12 | −6.6 |
| Example 3 | −6.6 |
| Example 5 | −6.6 |
| Example 6 | −6.6 |
| Example 4 | −6.7 |
| Example 13 | −6.7 |
| Example 20 | −7.3 |
| Ethylene-vinyl acetate copolymer | −8.0 |
| Ethylene-vinyl acetate copolymer | −8.2 |
| Ethylene-vinyl acetate copolymer | −8.4 |
| Ethylene-vinyl acetate copolymer | −8.5 |

TABLE 1-continued

| CHEMICAL CLASS | Δ ° C. |
|---|---|
| Example 26 | −8.5 |
| Ethylene-vinyl acetate copolymer | −9.7 |
| Example 14 | −10.4 |
| Example 25 | −10.6 |
| Example 15 | −10.9 |
| Example 23 | −11.4 |
| Example 24 | −11.6 |
| Example 21 | −11.7 |

We claim:

1. A biodiesel fuel composition comprising
a) a biodiesel fuel
and
b) a polymer or copolymer of the formula (I)

In-Poly-(E)$_y$ (I)

obtained by nitroxyl mediated controlled free radical polymerization,
wherein
In is the initiator fragment starting the polymerization reaction;
E is an end group bearing at least one stable free nitroxyl radical, which is bound via an oxygen atom to the polymer or copolymer; or a group which results from a substitution or elimination reaction of the attached stable free nitroxyl radical;
Poly is any polymer or copolymer formed from ethylenically unsaturated monomer(s);
y is a number 1 or greater than 1 indicating the average number of end groups E attached to Poly.

2. A composition according to claim 1, wherein the end group E is

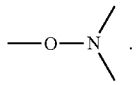

3. A composition according to claim 2, wherein the nitrogen of the end group is part of a 5 or 6-membered heterocyclic ring, which optionally has an additional nitrogen or oxygen atom in the ring system.

4. A composition according to claim 1, wherein component b) makes up about 0.05 to about 20 wt. % of the total weight of the biodiesel fuel composition.

5. A composition according to claim 1, wherein component a) is prepared from oils derived from rapeseed, soy, palm, palm olein, palm stearin, palm kernel oil, coriander oil, cottonseed oil, sunflower oil, castor oil, olive oil, peanut oil, maize oil, almond oil, palmseed oil, coconut oil, mustardseed oil, bovine tallow, bone oil, fish oils, used cooking oils and mixtures thereof.

6. A composition according to claim 5, wherein component a) makes up about 5 to about 99.1 wt. % of the total composition.

7. A composition according to claim 1, wherein the ethylenically unsaturated monomers are selected from the group consisting of styrenes, alkyl substituted styrenes, (meth)acrylic acid, (meth)acrylic acid ($C_1$-$C_{36}$)alkyl esters, (meth)acrylic acid ($C_1$-$C_{30}$)hydroxyalkyl or ($C_1$-$C_{30}$) polyhydroxy alkyl esters, (meth)acrylic esters of alkoxylated alcohols, (meth)acrylic poly-$C_2$-$C_4$alkyleneglycol esters, (meth)acrylic esters of alkoxylated phenols, (meth)acrylic acid($C_1$-$C_{36}$)alkyl esters which esters are substituted by amino, (meth)acrylamide N-mono($C_1$-$C_{30}$)alkyl, N,N-di($C_1$-$C_{30}$)alkyl (meth)acrylamide, which mono or disubstituted (meth)acrylamide ($C_1$-$C_{30}$)alkyl groups may additionally be unsubstituted or substituted by amino and mixtures thereof.

8. A composition according to claim 1, wherein the polymer or copolymer of Poly is a block, random, comb, star or gradient architecture.

9. A composition according to claim 1, wherein the In of formula (I) is selected from the group consisting of
—$CH_2$-phenyl, $CH_3$CH-phenyl, $(CH_3)_2$C-phenyl, ($C_5$-$C_6$cycloalkyl)$_2$CCN, $(CH_3)_2$CCN,

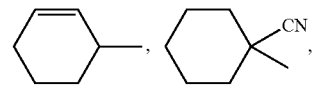

—$CH_2CH$=$CH_2$, $CH_3CH$—$CH$=$CH_2$ ($C_1$-$C_4$alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl and ($C_1$-$C_4$)alkyl-$CR_{20}$—C(O)—$NH_2$, wherein $R_{20}$ is hydrogen or ($C_1$-$C_4$)alkyl.

10. A method for improving the cold flow properties of a biodiesel fuel composition, which steps comprise adding to a biodiesel fuel at least 0.1 wt. % of the polymer or copolymer of formula (I) according to claim 1, where the wt. % is based on the total biodiesel fuel composition.

11. A method according to claim 10, wherein the composition contains about 5 to about 99.1 wt. % of component a).

12. A biodiesel composition according to claim 1 in which the polymer of formula I is obtained by nitroxyl mediated free radical polymerization and is subsequently modified by a transesterification reaction.

* * * * *